United States Patent
Gorman-Ladd et al.

(10) Patent No.: US 10,643,292 B1
(45) Date of Patent: May 5, 2020

(54) TRUST-BASED SOCIAL GRAPH FOR TRAVEL PLANNING

(71) Applicant: Amazon Technologies, Inc., Seattle, WA (US)

(72) Inventors: Jordan Anne Gorman-Ladd, Seattle, WA (US); Ethan Zane Evans, Snoqualmie, WA (US); Taneem Talukdar, Seattle, WA (US); Glenn Warren Van Houten, San Diego, CA (US)

(73) Assignee: Amazon Technologies, Inc., Seattle, WA (US)

( * ) Notice: Subject to any disclaimer, the term of this patent is extended or adjusted under 35 U.S.C. 154(b) by 910 days.

(21) Appl. No.: 14/806,307

(22) Filed: Jul. 22, 2015

(51) Int. Cl.
*G06Q 50/14* (2012.01)
*G06Q 30/02* (2012.01)
*G06Q 50/00* (2012.01)

(52) U.S. Cl.
CPC ......... *G06Q 50/14* (2013.01); *G06Q 30/0201* (2013.01); *G06Q 50/01* (2013.01)

(58) Field of Classification Search
CPC ..... G06Q 30/0201; G06Q 50/01; G06Q 50/14
USPC ....................................... 705/7.29
See application file for complete search history.

(56) References Cited

U.S. PATENT DOCUMENTS

| | | | |
|---|---|---|---|
| 5,982,507 A * | 11/1999 | Weiser | H04N 1/00222 358/402 |
| 6,266,649 B1 * | 7/2001 | Linden | G06Q 10/08345 705/14.51 |
| 7,212,983 B2 | 5/2007 | Redmann et al. | |
| 7,895,065 B2 | 2/2011 | Purang et al. | |
| 7,966,213 B2 | 6/2011 | Messa et al. | |
| 8,050,949 B2 | 11/2011 | Purang et al. | |
| 8,082,186 B2 | 12/2011 | Shuchman et al. | |
| 8,452,851 B2 | 5/2013 | Kabiljo et al. | |
| 8,594,925 B2 | 11/2013 | Amer-Yahia et al. | |
| 8,756,109 B1 | 6/2014 | Frank et al. | |
| 8,818,715 B2 | 8/2014 | Mahapatro et al. | |
| 8,819,009 B2 | 8/2014 | Wana et al. | |
| 8,825,370 B2 | 9/2014 | Hu et al. | |

(Continued)

OTHER PUBLICATIONS

Abdul Majid et al., A context-aware personalized travel recommendation system based on geotagged social media data mining. International Journal of Geographical Information Science, 2013. vol. 27, No. 4, 662-684.*

(Continued)

*Primary Examiner* — Timothy Padot
(74) *Attorney, Agent, or Firm* — Robert C. Kowert; Kowert, Hood, Munyon, Rankin & Goetzel, P.C.

(57) ABSTRACT

Methods and systems for implementing a trust-based social graph for travel planning are disclosed. Social data is obtained from one or more social network services. Based at least in part on the social data, trust scores are determined between an entity and a plurality of additional entities. For one of the additional entities, the respective trust score is determined based at least in part on a respective relationship score and a respective similarity score for the additional entity. One or more respective connections are generated in a social graph between the entity and one or more trusted entities of the additional entities. The one or more respective connections with the trusted entities are generated based at least in part on the respective trust scores.

20 Claims, 22 Drawing Sheets

(56) References Cited

U.S. PATENT DOCUMENTS

| | | | |
|---|---|---|---|
| 8,886,625 B1 | 11/2014 | Dorner et al. | |
| 8,973,100 B2 | 3/2015 | Rubinstein et al. | |
| 8,984,076 B1 | 3/2015 | Goldman | |
| 8,996,525 B1 | 3/2015 | Goldman et al. | |
| 9,026,601 B1 | 5/2015 | Gauvin | |
| 9,047,644 B1 | 6/2015 | Terleski | |
| 2006/0206363 A1 | 9/2006 | Gove | |
| 2009/0319288 A1* | 12/2009 | Slaney | G06Q 10/10 705/1.1 |
| 2011/0307280 A1 | 12/2011 | Mandelbaum | |
| 2012/0185793 A1* | 7/2012 | Binsztok | G06Q 10/02 715/772 |
| 2013/0024391 A1* | 1/2013 | Vakil | G06Q 30/0282 705/319 |
| 2013/0041696 A1* | 2/2013 | Richard | G06Q 30/06 705/5 |
| 2013/0166601 A1* | 6/2013 | Chrapko | G06Q 10/00 707/798 |
| 2013/0346329 A1* | 12/2013 | Alib-Bulatao | G06Q 10/06 705/319 |
| 2014/0108066 A1 | 4/2014 | Lam et al. | |
| 2014/0258160 A1 | 9/2014 | Chrapko et al. | |
| 2014/0316836 A1 | 10/2014 | Lipscher | |
| 2014/0379264 A1 | 12/2014 | Leblanc | |
| 2015/0106285 A1* | 4/2015 | Chu | G06Q 50/14 705/319 |
| 2015/0134378 A1 | 5/2015 | Van Doren et al. | |
| 2015/0149321 A1* | 5/2015 | Salameh | G06Q 50/01 705/26.41 |
| 2015/0161528 A1 | 6/2015 | Yalcin et al. | |
| 2015/0163256 A1 | 6/2015 | Frank | |
| 2015/0332176 A1 | 11/2015 | Shaw | |

OTHER PUBLICATIONS

TripHub Announces New Collaboration Tools to Help Social Networks Easily Plan Travel Together; Free Service is First to Centralize and Simplify Communications and Coordination for Friends,Families, and Shared Interest Groups. PR Newswire [New York] Aug. 8, 2006: n/a.*

U.S. Appl. No. 14/806,312, filed Jul. 22, 2015, Jordan Anne Gorman-Ladd, et al.

U.S. Appl. No. 14/806,313, filed Jul. 22, 2015, Gorman-Ladd, et al.

* cited by examiner

TRUST-BASED SOCIAL GRAPH FOR TRAVEL PLANNING

BACKGROUND

Many companies and other organizations operate distributed systems that interconnect numerous computing systems and other computing resources to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization and public data centers that are operated by entities as businesses to provide computing resources to customers. As the scale and scope of typical distributed systems have increased, the tasks of provisioning, administering, and managing the computing resources have become increasingly complicated.

Online social networks represent an increasingly common example of a type of service or application that is implemented using a distributed system. Such networks may be operated using social networking services that are widely available to individuals over the Internet. On many such social networks, an individual may create a profile, and the individual may choose to form connections with other profiles representing other individuals. Underlying a social network may be a social graph, where an individual is a node in the graph and each connection is an edge in the graph. In many cases, the connections between nodes may reflect real-world relationships between family members, friends, co-workers, and so on. Using the connections in the graph, users may choose to share various types of data with individual users or groups of users.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods and systems for travel planning using a repository of customizable itineraries and/or a trust-based social graph are described. A repository of itineraries may store predefined itineraries, and each itinerary may include an ordered set of trip components representing events and/or locations. The itineraries may be customizable by users, e.g., to substitute trip components or change the order of components. The customized itineraries may also be stored in the repository for duplication and further customization by the same user or other users.

Figure 1:
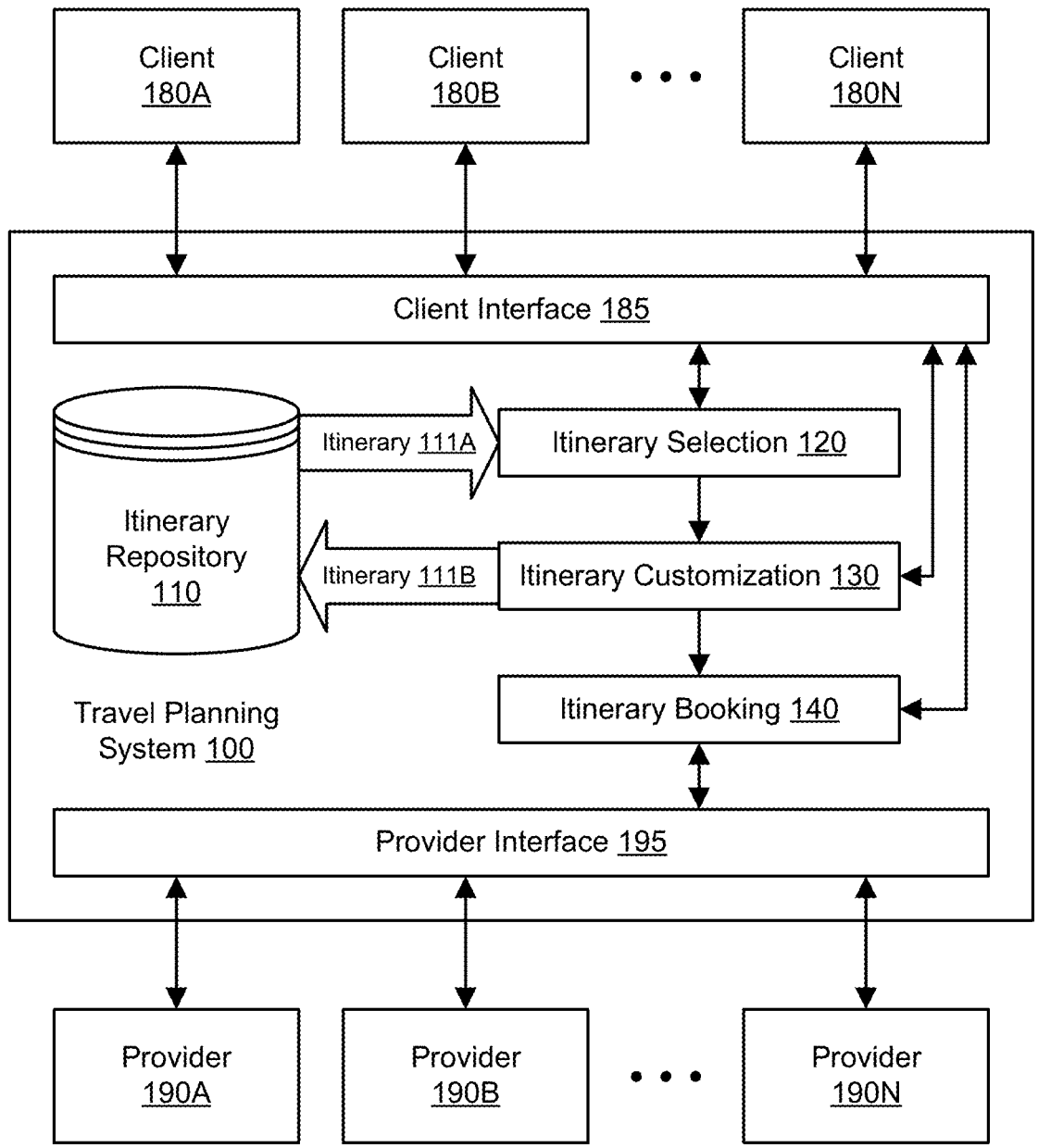
FIG. 1 illustrates an example system environment for implementing a repository of customizable itineraries for travel planning, according to one embodiment.

Customized itineraries may then be booked through agents or other providers. Itineraries may also be customized based on input from a social graph. A social graph may be created or modified based on trust scores between users or entities. A trust score may be based on relationship strength and a similarity of interests or preferences (e.g., for travel) between two parties. In this manner, users may plan personalized itineraries with input from trusted experts and/or friends. In a similar manner, a decision support system may implement a repository of customizable decision recipes that may be customized using input from a social graph Customizable Itineraries for Travel Planning FIG. 1 illustrates an example system environment for implementing a repository of customizable itineraries for travel planning, according to one embodiment. A travel planning system 100 may include a plurality of modules, components, or other elements of functionality that implement the selection, customization, and booking of itineraries using an itinerary repository 110. In one embodiment, the travel planning system 100 may include an itinerary selection functionality 120, an itinerary customization functionality 130, and an itinerary booking functionality 140. In one embodiment, the itinerary selection functionality 120, itinerary customization functionality 130, and itinerary booking functionality 140 may be responsive to user input to perform various tasks related to travel planning using the itinerary repository 110.

Using a client interface 185, the travel planning system 100 may interact with a plurality of clients such as clients 180A and 180B through 180N. The travel planning system 100 and clients 180A-180N may be communicatively coupled to one another using one or more suitable networks. The clients 180A-180N may represent various clients, users, client accounts, or user accounts. The clients 180A-180N may be implemented as computing instances, resources, processes, or any suitable combinations thereof. The client interface 185 may implement one or more user interfaces, programmatic interfaces, and/or application programming interfaces (APIs) enabling clients to select itineraries and/or trip components from the repository 110, customize itineraries and/or trip components, book itineraries and/or trip components, interact with other users (e.g., using a social graph), and perform other suitable tasks. Examples of user interfaces for travel planning are discussed below with respect to FIG. 2A through FIG. 2D.

Turning back to FIG. 1, using a provider interface 195, the travel planning system 100 may interact with a plurality of providers such as providers 190A and 190B through 190N. The travel planning system 100 and providers 190A-190N may be communicatively coupled to one another using one or more suitable networks. The providers 190A-190N may represent various types of providers such as travel agents, travel guides, event providers, lodging providers, transportation providers, and/or other providers of underlying services. The providers 190A-190N may be implemented as computing instances, resources, processes, or any suitable combinations thereof. In one embodiment, the providers 190A-190N may be structured in a plurality of levels or tiers, such that one provider may act as a travel agent or travel guide to package a set of trip components (e.g., representing events and/or services) to clients and then arrange for payment with one or more other providers who actually provide the events and/or services. The provider interface 195 may implement one or more programmatic interfaces or application programming interfaces (APIs) enabling providers to submit itineraries and/or trip components for storage in the repository 110, submit recommended changes to itineraries and/or trip components for users, book itineraries and/or trip components, and perform other suitable tasks. The travel planning system 100 may represent a service with which the clients 180A-180N and/or providers 190A-190N may interact, e.g., using one or more programmatic interfaces or APIs.

The repository 110 may store a plurality of itineraries, including customizable itineraries. An itinerary in the repository 110 may represent a travel plan or travel "recipe" for one or more users. The repository 110 may include a plurality of predefined itineraries and/or user-customized itineraries. The predefined itineraries may be supplied by providers 190A-190N including travel agents, travel guides, and/or other experts. Each itinerary may include a set of trip components representing a plurality of events, activities, and/or locations. The locations may be distributed over geographical areas of varying size, from a relatively small area (such as a single town or city) to a relatively large one (such as one or more nations or continents). The trip components may be distributed over time (e.g., hours or days), each trip component may have a duration, and an itinerary may include a chronological order for the set of trip components. In one embodiment, multiple trip components may be slotted in the same time slot or have overlapping times, in order to give users different options. The itinerary repository 110 or another suitable repository may also store trip components. At least some of the trip components may be supplied by providers 190A-190N, including travel agents, travel guides, event providers, lodging providers, transportation providers, and/or other providers of underlying services.

Using the itinerary selection functionality 120, an itinerary 111A may be selected from the repository 110. In one embodiment, the itinerary 111A may be selected based (at least in part) on user input. However, it is contemplated that the itinerary 111A may be selected by the travel planning system 100 without direct input by the user for whom the itinerary is selected, e.g., based on the travel history and/or travel preferences for the user and/or based on the travel history and/or travel preferences for other users or entities. In one embodiment, to select the itinerary 111A, a user (represented by one of the clients 180A-180N) may browse itineraries in a set of named travel categories or search for types of events, types of locations, specific events, or specific locations. At least a portion of the itineraries in the repository 110 may be tagged or otherwise classified in various travel categories for convenient browsing and/or searching. For example, travel categories may include "adventure travel," "leisure travel," "off-the-beaten-path travel," and other suitable classifications. In one embodiment, multiple itineraries may be selected for a single user with the itinerary selection functionality 120. In one embodiment, the repository 110 may also store trip components independently of itineraries, and multiple trip components may be selected for a single user with the itinerary selection functionality 120. In various embodiments, the trip components may be selected with or without user input.

Using the itinerary customization functionality 130, the itinerary 111A may be customized to create a customized itinerary 111B. The customized itinerary 111B may include one or more user-selected modifications to the chronological order. The customized itinerary 111B may include one or more user-selected substitutions to the set of trip components, one or more added components, and/or one or more deleted components. One or more user-selected substitutions to the set of trip components may be selected from a repository of trip components (potentially the same repository 110 that stores itineraries). The customized itinerary 111B may include a user-selected modification to the duration, starting time, and/or ending time of a trip component. The customized itinerary 111B may include one or more user-selected modifications to one or more parameters of a trip component. In one embodiment, the itinerary 111A may be customized based (at least in part) on user input, e.g., input from the user who selected the itinerary and/or input from one or more additional users who are identified as potential participants in the itinerary. The customized itinerary 111B may be stored in the repository 110. In one embodiment, the customized itinerary 111B may represent a composite itinerary that is generated based on multiple itineraries, e.g., based on user input to combine different portions of the multiple itineraries. In one embodiment, the customized itinerary 111B may be generated based on multiple trip components that are combined (e.g., based on user input) to generate a new itinerary.

Using the itinerary booking functionality 140, an itinerary such as the itinerary 111A or customized itinerary 111B may be booked with one or more providers 190A-190N. A particular range of time may be assigned to the itinerary 111A or 111B. The particular range of time may include a specific starting date and time and a specific ending date and time. In one embodiment, the particular range of time may be assigned to the itinerary 111A or 111B based (at least in part) on user input, e.g., input from the user who selected or customized the itinerary and/or input from one or more additional users who are identified as potential participants in the itinerary. The itinerary 111A or 111B may be booked by generating a reservation of the itinerary for one or more clients, e.g., for the particular range of time. The client(s) may include the user who selected or customized the itinerary and/or one or more additional users who are identified as potential participants in the itinerary. The reservation may include an agreement by the one or more clients to purchase at least a portion of the itinerary 111A or 111B and/or any other suitable transaction, including a payment to one or more providers. The reservation may be booked through one or more providers 190A-190N, including travel agents, travel guides, event providers, lodging providers, transportation providers, and/or other providers of underlying services. The providers participating in the booking may be structured in a plurality of levels or tiers, such that one provider may act as a travel agent or travel guide to package a set of trip components (e.g., representing events and/or services) to clients and then arrange for payment with one or more other providers who actually provide the events and/or services. The itinerary 111A or 111B may be booked using one or more payment services of any suitable type.

Figure 18:
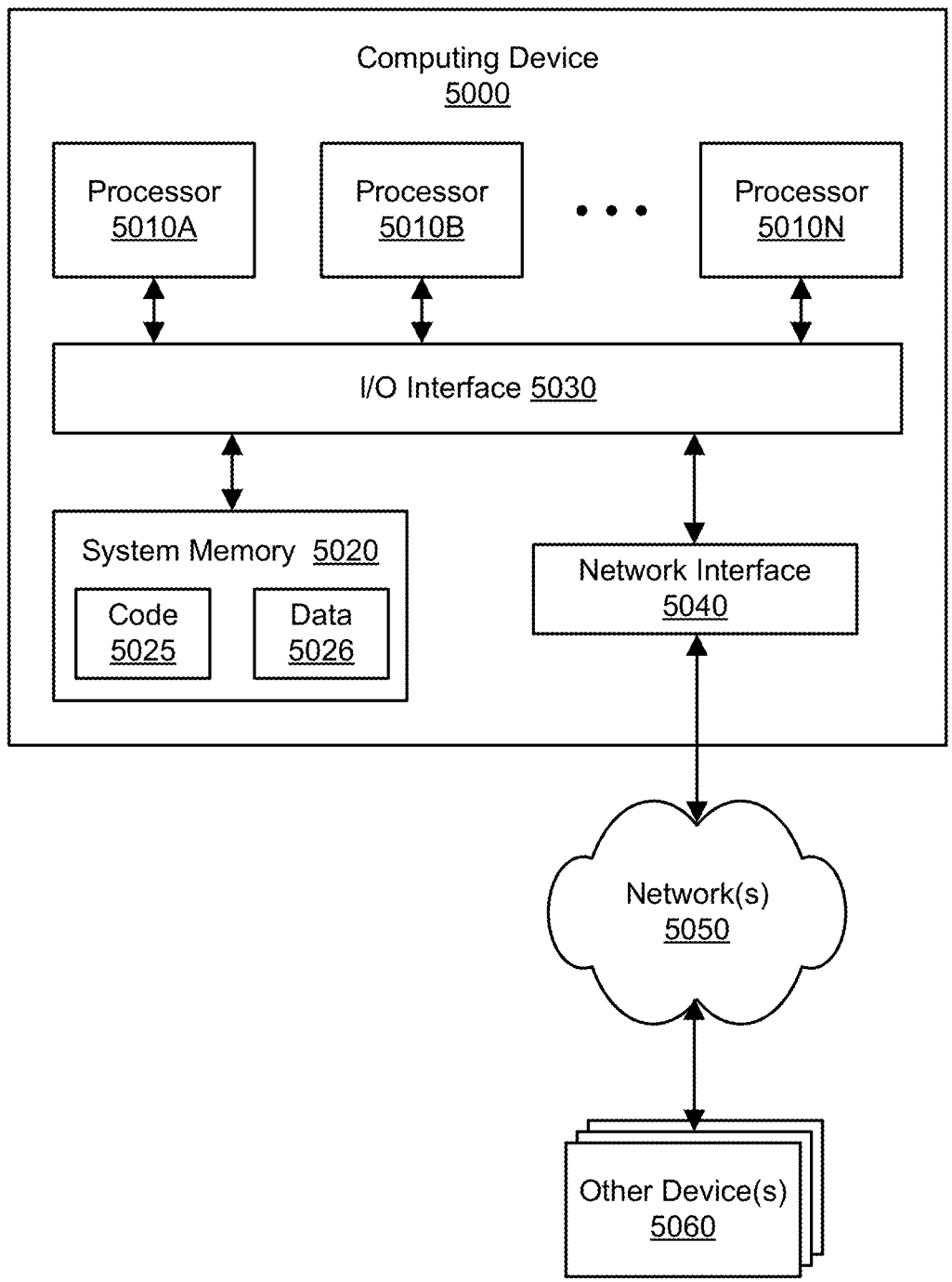
FIG. 18 illustrates an example of a computing device that may be used in some embodiments.

The travel planning system 100 may comprise one or more computing devices, any of which may be implemented by the example computing device 5000 illustrated in FIG. 18. In various embodiments, portions of the functionality of the travel planning system 100 may be provided by the same computing device or by any suitable number of different computing devices. If any of the components of the travel planning system 100 (such as the itinerary repository 110, itinerary selection functionality 120, itinerary customization functionality 130, and itinerary booking functionality 140) are implemented using different computing devices, then the components and their respective computing devices may be communicatively coupled, e.g., via a network. Each of the illustrated components (such as the itinerary repository 110, itinerary selection functionality 120, itinerary customization functionality 130, and itinerary booking functionality 140) may represent any combination of software and hardware usable to perform their respective functions.

It is contemplated that the travel planning system 100 may include additional components not shown, fewer components than shown, or different combinations, configurations, or quantities of the components shown. For example, although three clients 180A, 180B, and 180N are shown for purposes of example and illustration, it is contemplated that different quantities and configurations of clients may be used. Additionally, although three providers 190A, 190B, and 190N are shown for purposes of example and illustration, it is contemplated that different quantities and configurations of providers may be used.

In some embodiments, travel planning system 100, clients 180A-180N, and/or providers 190A-190N may be implemented using virtual compute instances and/or physical compute instances. The virtual compute instances and/or physical compute instances may be offered to clients, provisioned, and maintained by a provider network that manages computational resources, memory resources, storage resources, and network resources. A virtual compute instance may comprise one or more servers with a specified computational capacity (which may be specified by indicating the type and number of CPUs, the main memory size, and so on) and a specified software stack (e.g., a particular version of an operating system, which may in turn run on top of a hypervisor). One or more virtual compute instances may be implemented by the example computing device 5000 illustrated in FIG. 18.

In one embodiment, the travel planning system 100 may select and/or provision virtual compute instances for implementing the various components of the travel planning system (such as the itinerary repository 110, itinerary selection functionality 120, itinerary customization functionality 130, and itinerary booking functionality 140). For example, the virtual compute instances may be provisioned from a suitable pool of available computing instances. In one embodiment, additional computing instances may be added to the travel planning system 100 as needed. In one embodiment, computing instances may be returned to the pool of available computing instances if the computing instances are not needed at a particular point in time.

In one embodiment, the functionality of the travel planning system 100 may be provided to clients 180A-180N and/or providers 190A-190N using a provider network. For example, the functionality of the travel planning system 100 may be presented to clients and/or providers as a web-accessible service. A network set up by an entity such as a company or a public sector organization to provide one or more services (such as various types of cloud-based computing or storage) accessible via the Internet and/or other networks to a distributed set of clients may be termed a provider network. A provider network may include numerous data centers hosting various resource pools, such as collections of physical and/or virtualized computer servers, storage devices, networking equipment and the like, that are used to implement and distribute the infrastructure and services offered by the provider. The resources may, in some embodiments, be offered to clients in units called "instances," such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices, and the like.

Figure 2A:
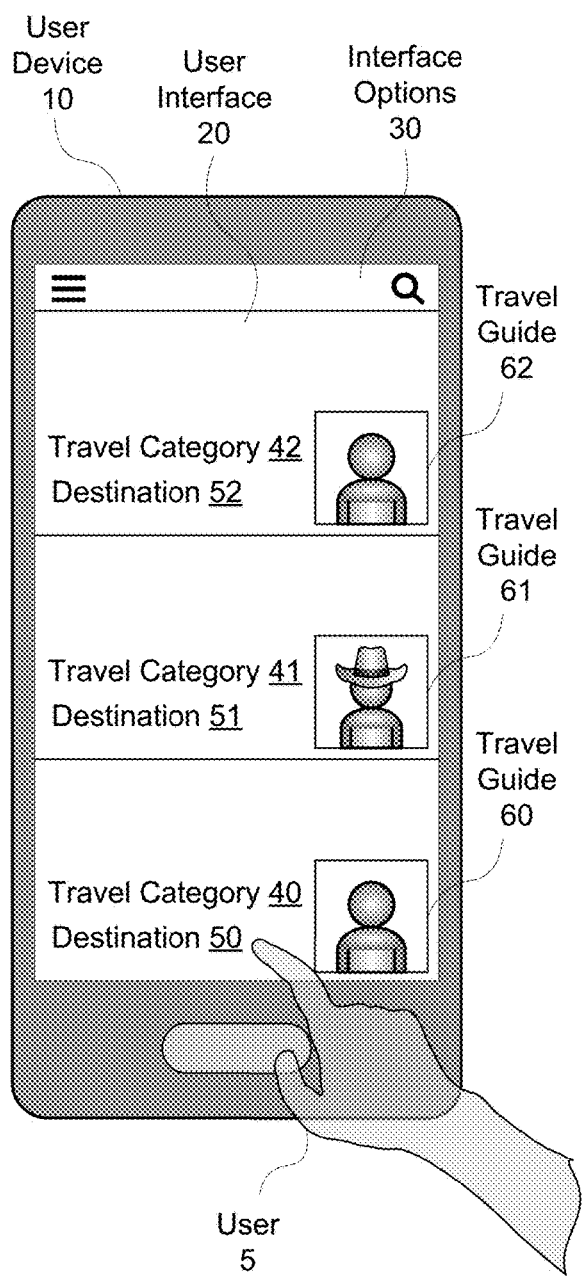
FIG. 2A through FIG. 2D illustrates examples of user interfaces for a system that implements a repository of customizable itineraries for travel planning, according to one embodiment.

FIG. 2A through FIG. 2D illustrates examples of user interfaces for a system that implements a repository of customizable itineraries for travel planning, according to one embodiment. FIG. 2A illustrates an example of a user interface 20 for travel planning. The user interface 20 may be displayed to a user 5 on a user device 10. The user device 10 may represent one of the client devices 180A-180N that interact with the travel planning system 100 via the client interface 185. Although user device 10 is depicted as a mobile device for purposes of illustration and example, it is contemplated that any suitable type of computing device may be used as a client device 180A-180N with the travel planning system 100. The user device 10 may be implemented by the example computing device 5000 illustrated in FIG. 18. Aspects of the user interface may be generated by the user device 10 and/or by the client interface 185.

The user interface 20 may include several distinct regions. For example, the user interface 20 may include a region for interface options 30 and a primary region in which different travel categories and/or destinations are displayed. In the primary region, different travel categories, destinations, travel guides, and/or other travel planning options may be displayed to the user 5. As shown in the example of FIG. 2A, a series of destinations such as destinations 50, 51, and 52 may be displayed in the user interface 20. The destinations may indicate names or descriptions of geographical regions or locales, including particular travel attractions, natural features, parks, towns, cities, nations, and so on. Each destination may be classified in one or more travel categories. For example, travel categories may include general travel categories such as "adventure," "leisure," and "off the beaten path"; more specific travel categories such as "art museums" and "spelunking"; and other suitable types of categories. The travel categories may be displayed along with the associated destinations. As shown in the example of FIG. 2A, destination 50 may be displayed under its travel category 40, destination 51 may be displayed under its travel category 41, and destination 52 may be displayed under its travel category 42. In one embodiment, each destination may correspond to a particular predefined itinerary.

Each destination may be associated with a particular travel guide, travel agent, or other specialist or expert. The travel guides may supply and curate itineraries that are associated with the various destinations. As shown in the example of FIG. 2A, destination 50 may be displayed with a depiction and/or identification of its travel guide 60, destination 51 may be displayed with a depiction and/or identification of its travel guide 61, and destination 52 may be displayed a depiction and/or identification of its travel guide 62. The travel guides may typically be individuals but may also be business entities or other organizations.

The user 5 may interact with regions or elements of the user interface 20 to reveal additional information, e.g., by using appropriate gestures or actions in a touch-capable interface of the user device 10. For example, the user 5 may interact with the name or description of a travel category in order to reveal additional destinations under that travel category. As another example, the user 5 may scroll or otherwise navigate through a series of travel categories, including travel categories that are not shown in FIG. 2A. The interface options 30 may include graphical depictions of options such as a search functionality (in the upper right corner) and a configuration functionality (in the upper left corner). In one embodiment, using the search functionality in the interface options 30, the user 5 may search for particular travel categories, destinations, travel guides, and/or other travel planning options.

Figure 2B:
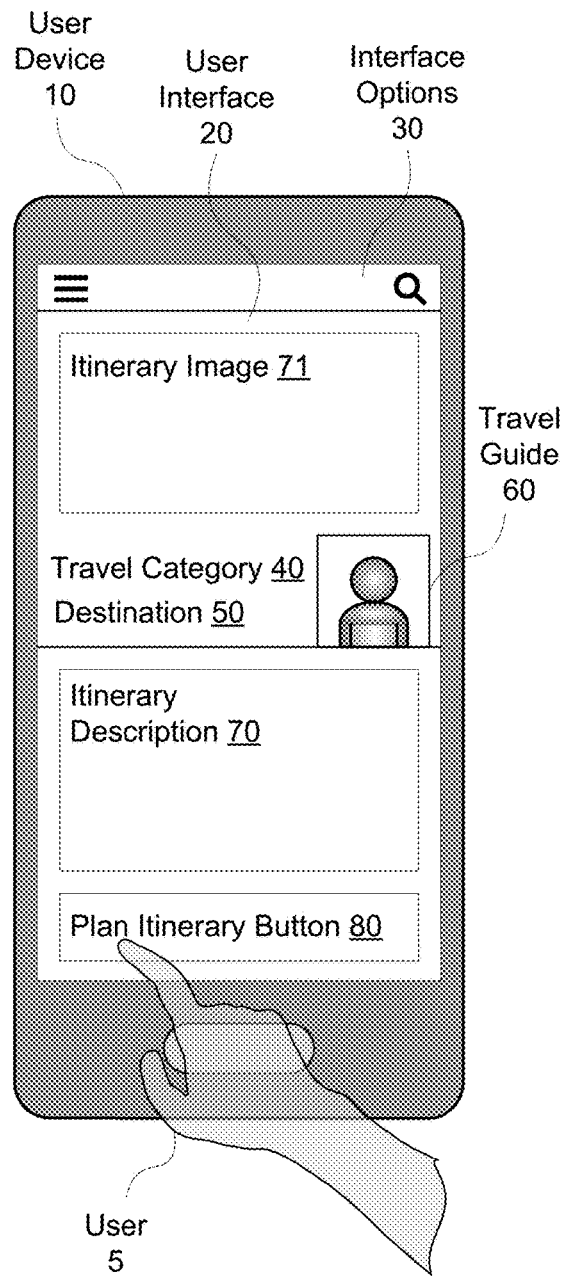

As shown in the example of FIG. 2A, the user 5 may select a particular destination 50 in the user interface 20. Any suitable user input may select the destination 50, including a "tap and hold" or sufficiently long press in a touch-capable interface of the user device 10. As shown in FIG. 2B, additional information related to the selected destination 50 may be displayed as a result of the selection by the user 5. For example, an itinerary image 71 may be displayed in the user interface 20; the itinerary image 71 may include an appealing depiction of the destination. An itinerary description 70, potentially including an appealing textual description, may also be displayed in the user interface 70. In one embodiment, the travel guide 60 for the destination 50 may supply, curate, and/or approve the submission of the image 71 and description 70 for the destination 50, as well as the classification of the destination in the travel category 40.

Figure 2C:
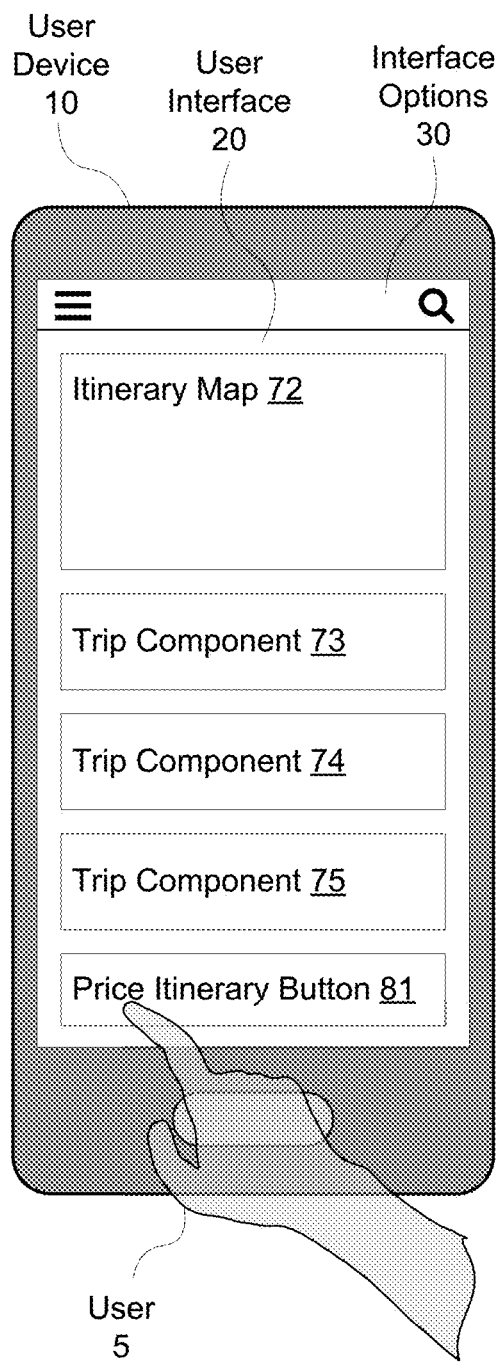

The user interface 20 may also include a plan itinerary button 80. As shown in the example of FIG. 2B, the user 5 may press the plan itinerary button 80 in the user interface 20. Any suitable user input may represent a pressing of the plan itinerary button 80, including input in a touch-capable interface of the user device 10. As shown in FIG. 2C, additional information may be displayed in the user interface 20 when the user has indicated that she or he wishes to plan the itinerary associated with the destination 50. For example, an itinerary map 72 may be displayed that indicates the locations of various components of the itinerary. Additionally, the user interface 20 may display a set of trip components such as trip components 73, 74, and 75. The trip components 73, 74, and 75 may be arranged in an order, such as a chronological order from top to bottom. The trip components 73, 74, and 75 may represent various activities, events, locations, or other elements of the itinerary. In one embodiment, the user 5 may interact with the user interface 20 to customize the set of trip components and/or their parameters. Customized itineraries may be saved in the repository 110 and may be browsable, searchable, and/or further customizable by the same user or different users in the user interface 20. Examples of itinerary customization are discussed below with respect to FIG. 3. In one embodiment, the travel guide 60 may assist in the customization of the itinerary, e.g., upon request from the user 5.

Figure 2D:
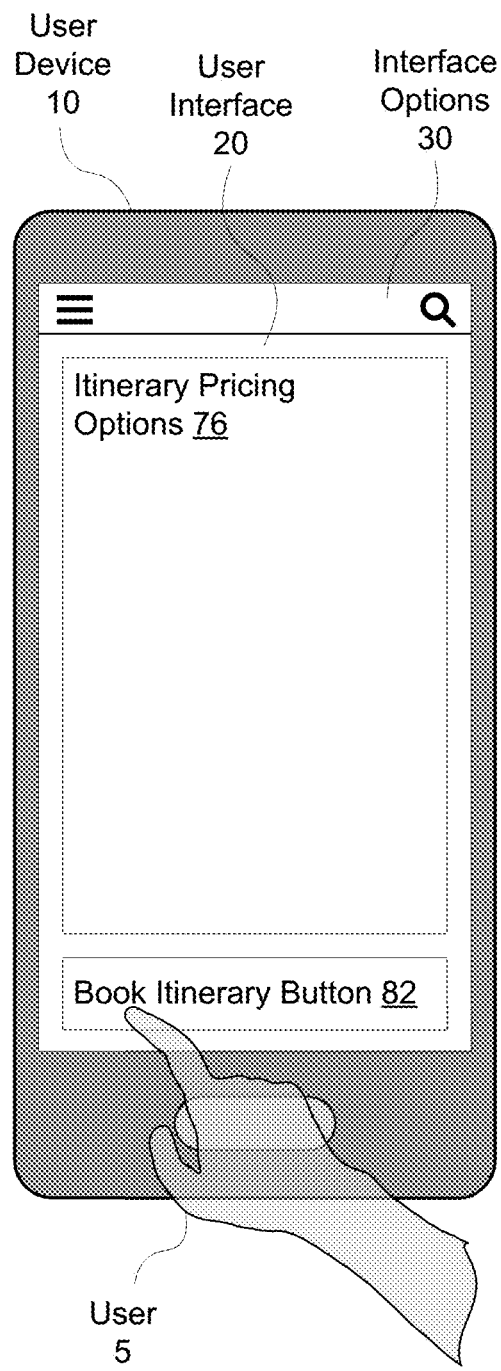

Turning back to FIG. 2C, the user interface 20 may also include a price itinerary button 81. As shown in the example of FIG. 2C, the user 5 may press the price itinerary button 81 in the user interface 20. Any suitable user input may represent a pressing of the price itinerary button 81, including input in a touch-capable interface of the user device 10. As shown in FIG. 2D, additional pricing information and/or options 76 may be displayed in the user interface 20 when the user has indicated that she or he wishes to price the itinerary associated with the destination 50. For example, the itinerary may offer different pricing options for different dates and times, different transportation choices, different lodging choices, and so on. In one embodiment, aspects of the pricing options 76 may be supplied and/or curated by the travel guide 60. The user interface 20 may also include a book itinerary button 82. As shown in the example of FIG. 2D, the user 5 may press the book itinerary button 82 in the user interface 20 to generate a reservation of the itinerary, including one or more of the trip components. In one embodiment, the itinerary may be booked with the assistance of the travel guide 60. For example, booking the itinerary may result in payment to the travel guide 60 using a secure payment service, and the travel guide may then arrange for payment with the providers of underlying services in the itinerary.

It is contemplated that the user interface 20 illustrated in FIG. 2A through 2D may include additional components not shown, fewer components than shown, and/or different configurations of components than shown. For example, the user interface 20 may permit the user 5 to assign a range of time, including a starting date and time and an ending date and time, to an itinerary. As another example, the user interface 20 may permit the user 5 to add other individuals or groups to an itinerary. As yet another example, the user interface 20 may include social graph interaction, such as the capability of the user 5 to share an itinerary with other entities in her or his social graph (or using an external social network), call for a vote as to options for a trip component or itinerary, and/or other forms of social interaction related to itineraries and their components. As a further example, the user interface 20 may permit a user to add one or more itineraries and/or trip components to a wishlist.

Figure 3:
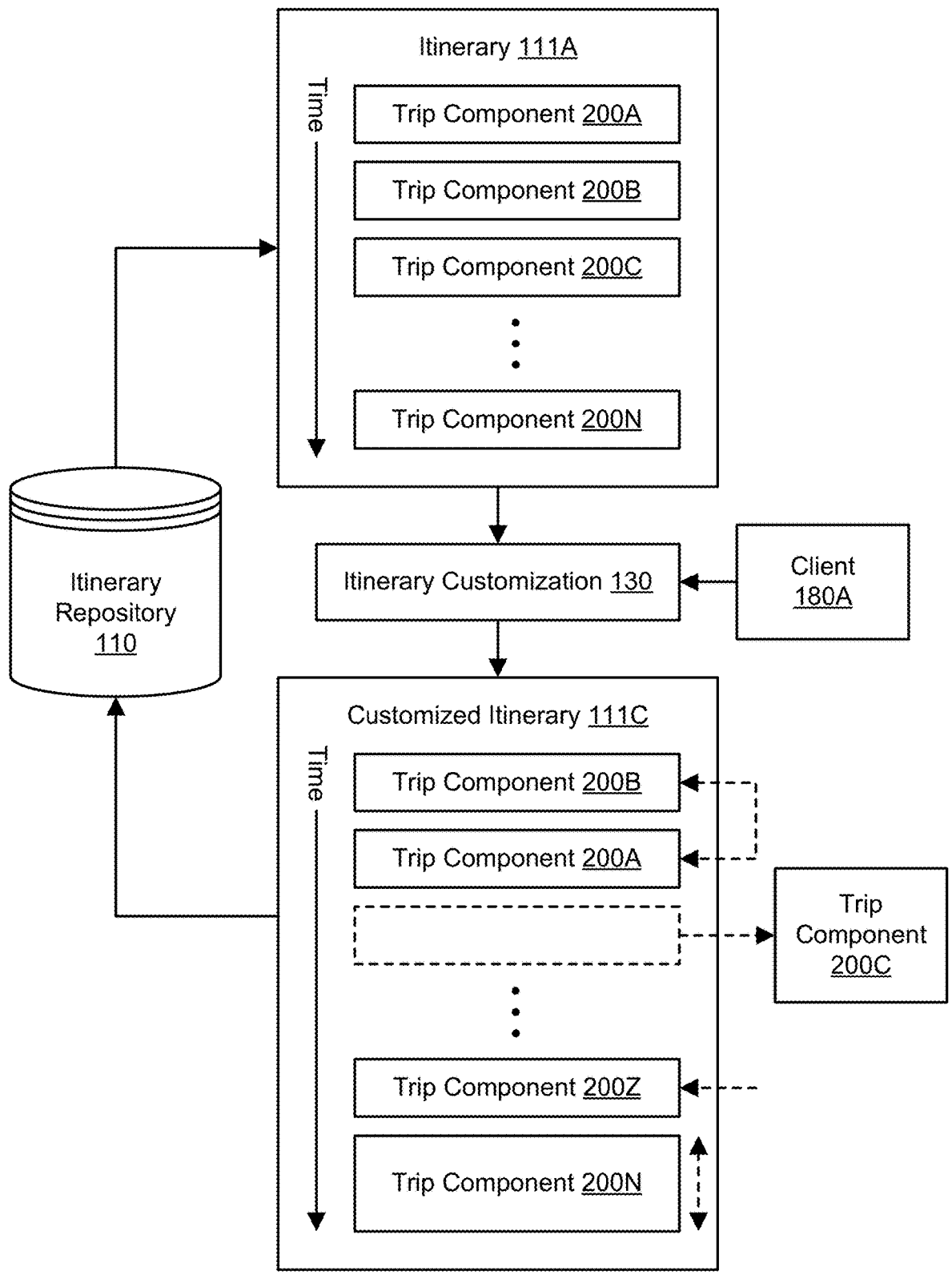
FIG. 3 illustrates examples of customization of itineraries for travel planning, according to one embodiment.

FIG. 3 illustrates examples of customization of itineraries for travel planning, according to one embodiment. The itinerary 111A may include a set of trip components (such as trip components 200A-200N) that represent a plurality of events, activities, and/or locations. Although four trip components 200A through 200C and 200N are shown for purposes of example and illustration, it is contemplated that any suitable number and configuration of trip components may be used with an itinerary. The locations may be distributed over geographical areas of varying size, from a relatively small area (such as a single town or city) to a relatively large one (such as one or more nations or continents). The trip components 200A-200N may be distributed over time (e.g., hours or days), each trip component may have a duration, and the particular itinerary may include a chronological order for the set of trip components. The itinerary 111A may represent a predefined itinerary or an itinerary that has been previously copied and/or customized one or more times.

As shown in FIG. 3, the itinerary customization functionality 130 may generate a customized itinerary 111C based on the itinerary 111A. The customized itinerary 111C may be generated based (at least in part) on user input, e.g., as entered by a client 180A from a user who selected the itinerary 111A and/or from one or more additional users who are identified as potential participants in the itinerary. The customized itinerary 111C may be stored in the repository 110 for potential reuse, including duplication and/or further customization by the same user or one or more additional users. The customized itinerary 111C may include one or more modifications to the chronological order. As shown in the example of FIG. 3, the order of trip components 200A and 200B has been swapped in the customized itinerary 111C.

The customized itinerary 111C may include one or more deleted trip components. As shown in the example of FIG. 3, component 200C has been removed from the customized itinerary 111C. In one embodiment, the dates and times and/or durations of other components may be modified automatically in response to the deletion of component 200C, e.g., to fit the entire trip within a particular range of time indicated by a starting date and time and an ending date and time.

The customized itinerary 111C may include one or more added trip components. As shown in the example of FIG. 3, new trip component 200Z has been added to the customized itinerary 111C in a particular time slot prior to component 200N. In one embodiment, the new trip component 200Z may be selected from a repository of trip components (potentially the same repository 110 that stores itineraries). In one embodiment, the dates and times and/or durations of other components may be modified automatically in response to the addition of component 200Z, e.g., to fit the entire trip within a particular range of time indicated by a starting date and time and an ending date and time.

The customized itinerary 111C may include one or more modifications to the duration of one or more components. As shown in the example of FIG. 3, the duration of trip component 200N has been increased in the customized itinerary 111C. In one embodiment, the dates and times and/or durations of other components may be modified automatically in response to the change to component 200N, e.g., to fit the entire trip within a particular range of time indicated by a starting date and time and an ending date and time.

Figure 4:
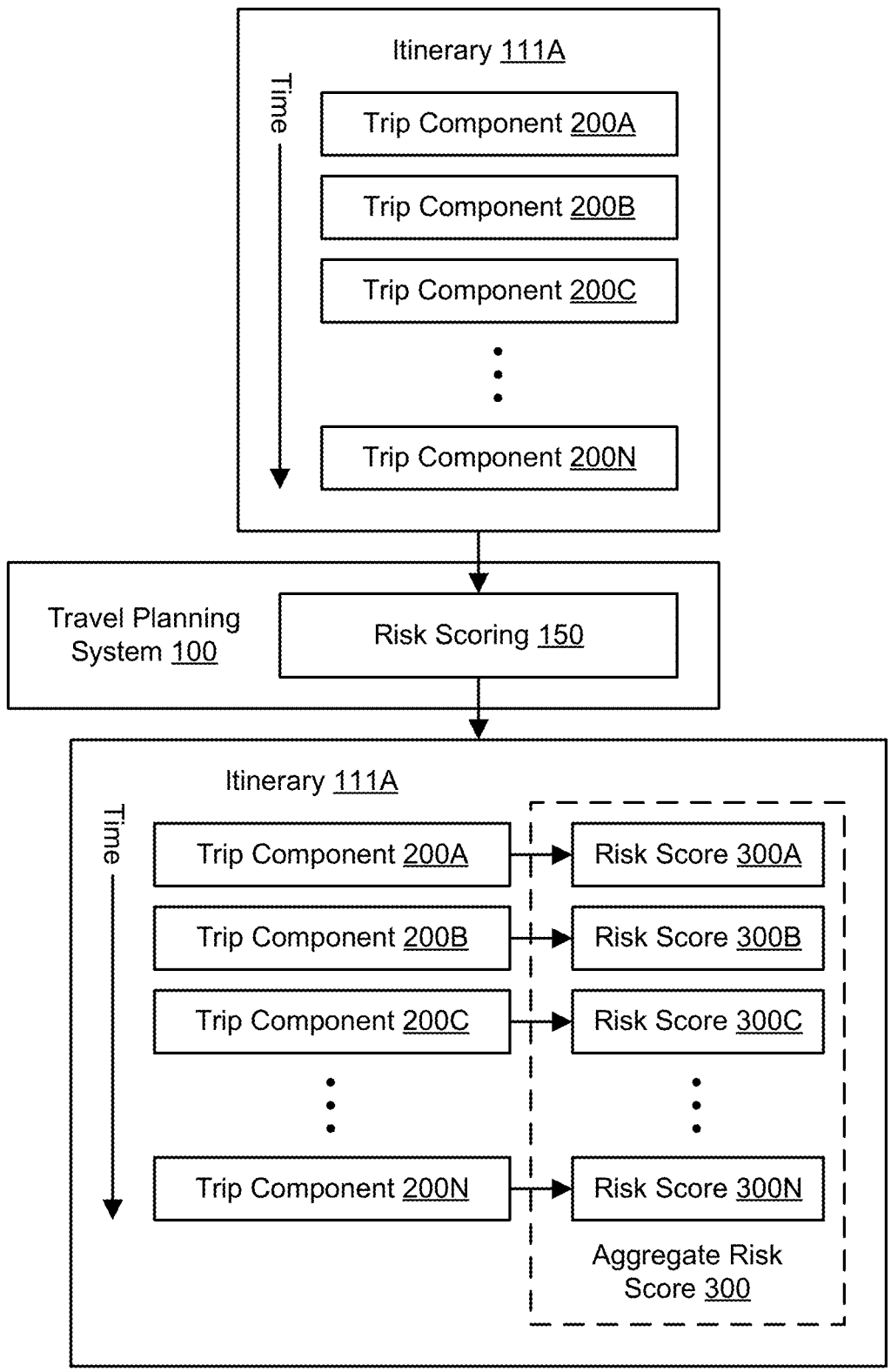
FIG. 4 illustrates risk scoring of customizable itineraries for travel planning, according to one embodiment.

FIG. 4 illustrates risk scoring of customizable itineraries for travel planning, according to one embodiment. The travel planning system 100 may include a risk scoring functionality 150. Using the risk scoring functionality 150, the aggregate risk score 300 for an itinerary 111A may be estimated. The aggregate risk score 300 may represent an estimated likelihood of success for the itinerary 111A as a whole. The risk scoring functionality 150 may determine the aggregate risk score 300 based (at least in part) on individual risk scores for individual trip components in the itinerary 111A, such as risk score 300A for trip component 200A, risk score 300B for trip component 200B, risk score 300C for trip component 200C, and risk score 300N for trip component 200N. The individual risk scores 300A-300N may also be determined by the risk scoring functionality 150. Each of the individual risk scores 300A-300N may represent an estimated likelihood of success for the corresponding trip component. The individual risk scores 300A-300N and the aggregate risk score 300 may be determined for a particular range of time assigned to the itinerary, including a starting date and time and an ending date and time.

Each of the individual risk scores 300A-300N may be determined based on a definition of success for the corresponding trip component. The definitions of success may be associated with particular components or with categories of components. The definitions of success may be evaluated with respect to any suitable information concerning an itinerary and/or its components, including historical success data for components, historical weather data for particular locales, anticipated weather data for particular locales, historical usage data for components such as events and lodging, geographical or proximity analysis for trip components, and other suitable data for individual components or sets of components. For example, a lodging component may be evaluated based on an estimated likelihood that a reservation is honored or not honored by the underlying provider due to an estimated usage for particular dates. As another example, a transportation component may be evaluated based on an estimated likelihood that inclement weather does not cause cancellation for particular dates. The individual risk score for a trip component may be evaluated with respect to other trip components in the itinerary. For example, an event component may be evaluated based on an estimated likelihood that the user can successfully begin the component at its assigned starting time in view of a geographical distance from the previous trip component and its assigned ending time. Similarly, one or more event components may be evaluated based on their proximity to a lodging component selected for the itinerary.

The aggregate risk score 300 may be displayed to one or more users, e.g., in a user interface. In one embodiment, the individual risk scores 300A-300N for trip components may also be displayed to one or more users. The risk scores may be displayed as numerals in a range representing a high chance of failure to a high chance of success (e.g., between 0 and 100). The risk scores may be displayed as graphical elements representing varying chances of failure or success. For example, a green indicator may be displayed for an itinerary or component with a high chance of success, a yellow indicator may be displayed for an itinerary or component with a medium chance of success, and a red indicator may be displayed for an itinerary or component with a low chance of success. If the itinerary is customized (or further customized), the risk may be estimated again, and the updated risk score may again be displayed to one or more users. The individual risk scores 300A-300N and the aggregate risk score 300 may be updated based on the availability of new data (e.g., weather data) or new definitions of success. In one embodiment, the travel planning system 100 may recommend substitute trip components or modified dates, times, or durations for trip components in order to increase the estimated likelihood of success as represented in the aggregate risk score 300.

Figure 5A:
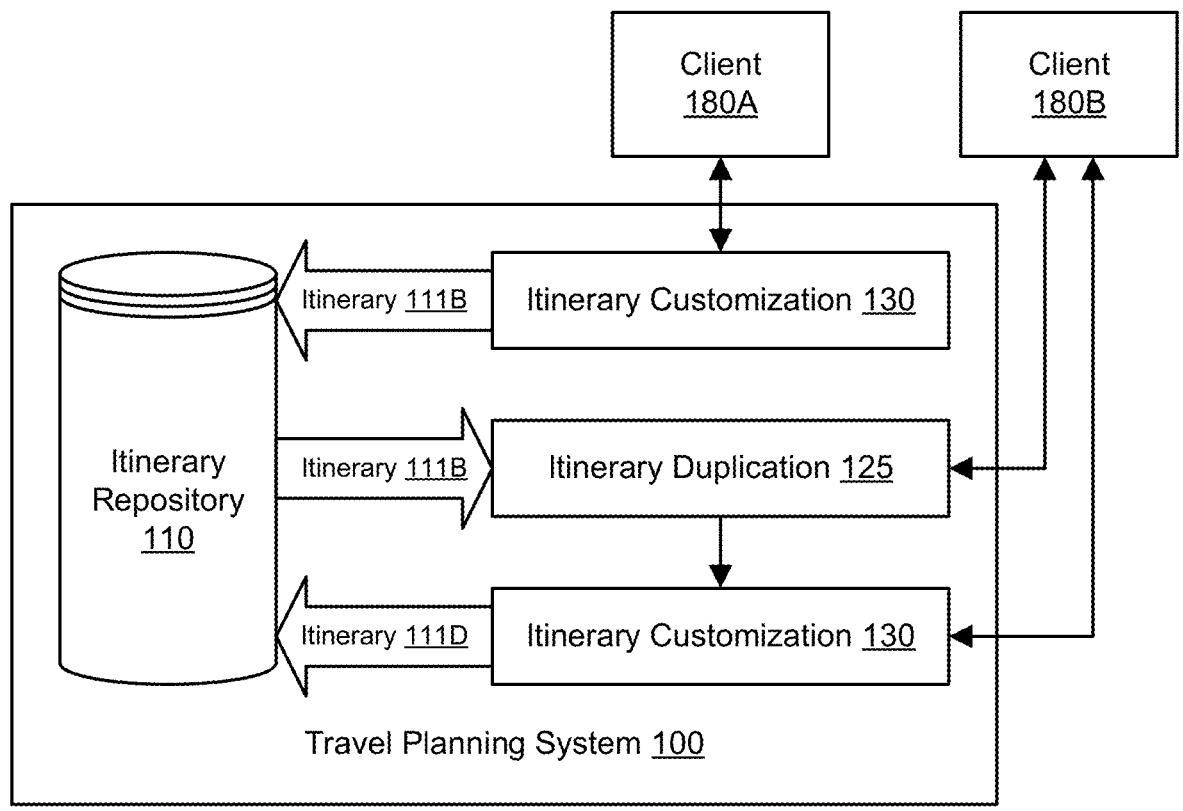
FIG. 5A through 5C illustrate duplication of customizable itineraries for travel planning, including change notification, according to one embodiment.

FIG. 5A illustrates duplication of customizable itineraries for travel planning, according to one embodiment. The travel planning system 100 may include an itinerary duplication functionality 125. Using the itinerary duplication functionality 125, an itinerary may be duplicated for the same user or one or more additional users. The duplication of an itinerary may also be referred to as the cloning or copying of an itinerary. For example, based on input from client 180A, the itinerary customization functionality 130 may generate a customized itinerary 111B and store the customized itinerary in the itinerary repository 110. Using the itinerary duplication functionality 125, the customized itinerary 111B may be retrieved from the repository 110, and a copy of the customized itinerary 111B may be generated for a second user represented by client 180B. The copy of the customized itinerary 111B may be further customized by the second user, and the resulting customized itinerary 111D may be stored in the repository 110 for potential reuse and potential further modification.

In one embodiment, the duplication and customization of an itinerary may permit an itinerary to be relocated from one general location (or set of locations) to another, e.g., from one nation or region to another. For example, the travel planning system 100 may substitute trip components for similar trip components in translating a set of components from one geographical destination to another. The duplication and customization of an itinerary may also permit a user to revert to a previous version of the itinerary, e.g., to undo changes made in the customization process. In one embodiment, the change history for an itinerary may be available to a user. The user may select a previous version of the itinerary to restore that version and thus undo changes. Versions of itineraries may be sent to other users, e.g., through a messaging system build on a social graph.

In one embodiment, a user may select or enable a privacy profile that may allow or deny the copying of private trip components and/or private itineraries by particular other users and/or groups of users. Accordingly, based (at least in part) on a privacy profile and/or any suitable privacy mechanisms, trip components designated as private may be excluded from a copy of an itinerary made by another user. In one embodiment, different levels of privacy and access control may be assigned to trip components and/or itineraries, including "read and write" permissions for the owner, "read and write" permissions for other designated users or groups, "read only" permissions for other designated users or groups (including a global group of users), and "no read or write" permissions for designated users or groups (including a global group of users).

Figure 5B:
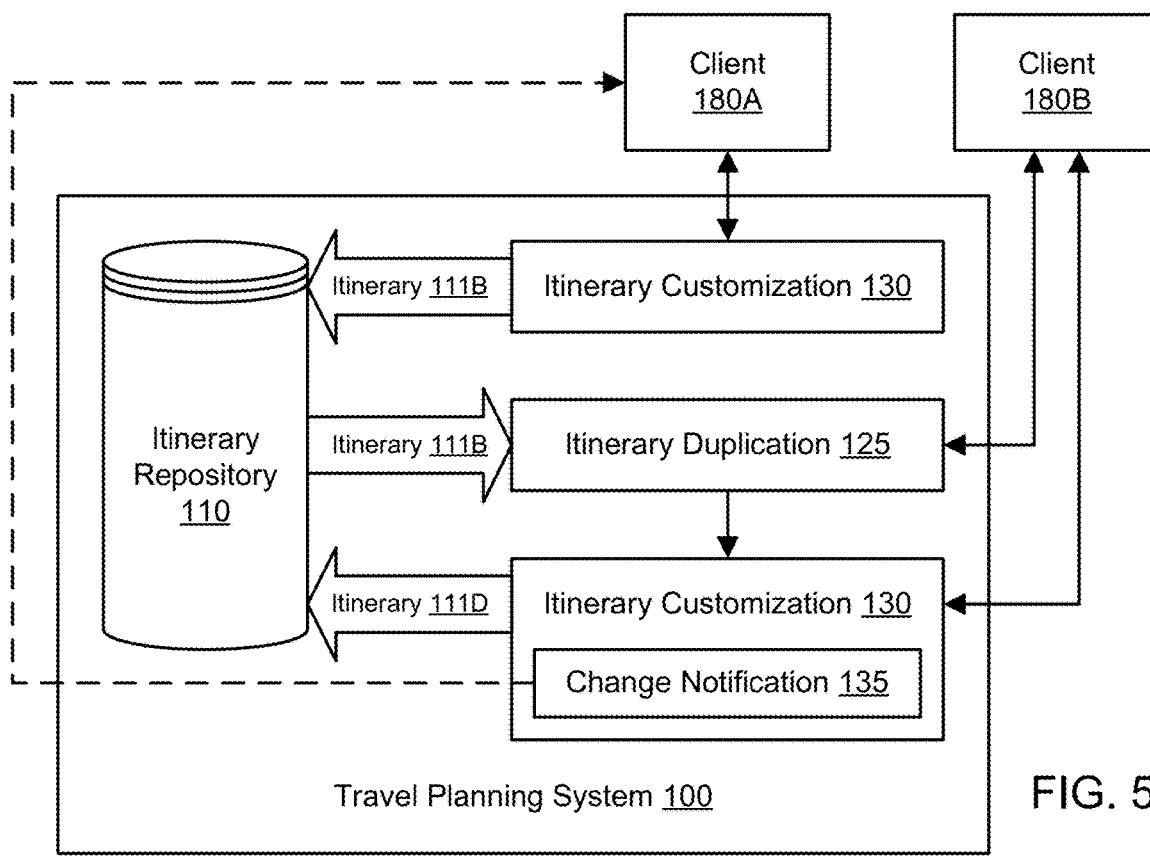
Figure 5C:
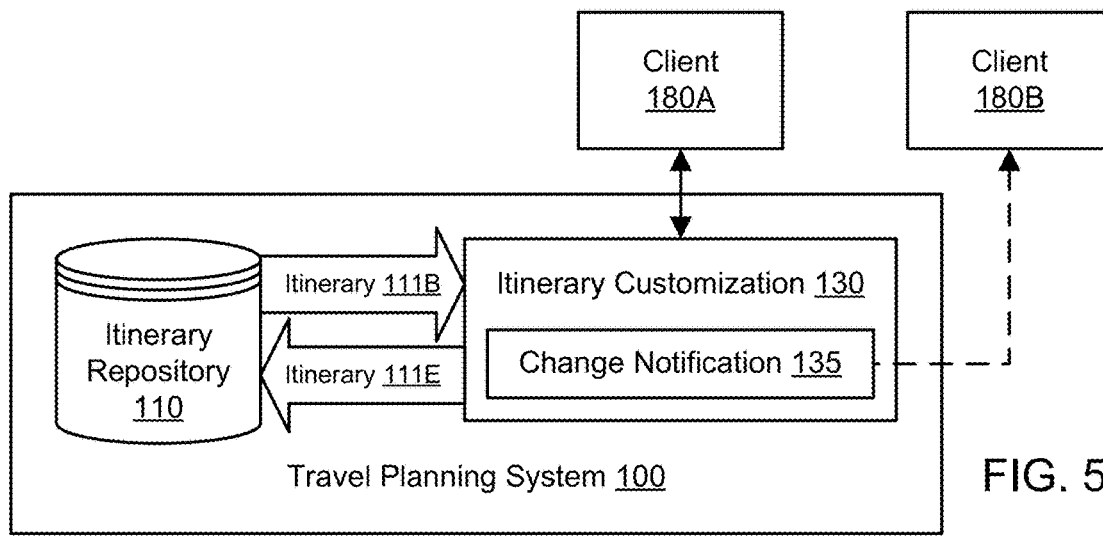

FIG. 5B and FIG. 5C illustrate change notifications to clients after duplication of customizable itineraries for travel planning, according to one embodiment. An original itinerary (either predefined or customized) may be customized, managed, or otherwise designated as owned by a first user, and a copy of that original itinerary may be customized, managed, or otherwise designated as owned by a second user. If the second user customizes her or his copy, a notification of the changes may be sent automatically to the first user. As shown in the example of FIG. 5B, a second user (represented by client 180B) may generate a customized itinerary 111D that was cloned from the itinerary 111B belonging to a first user (represented by client 180A). Using a change notification functionality 135, the first user may be automatically notified of changes made to an itinerary that was cloned from an itinerary belonging to that first user. In one embodiment, the relationships between itineraries and their copies may be maintained in the repository 110 using any suitable data structures. For example, a tree structure may represent parent-child relationships between an itinerary and its clones, and the tree structure may include multiple levels of children. In one embodiment, the changes may be presented to the first user based on the change notification 135, and user input may be solicited from the first user to accept or reject the changes with respect to the original itinerary 111B.

Using the change notification functionality 135, the second user may be automatically notified of changes made to an itinerary that was the source of an itinerary belonging to that second user. As shown in the example of FIG. 5C, if the original itinerary 111B is customized (or further customized) after it was cloned for itinerary 111D, a notification of the changes may be sent automatically to the second user. For example, customized itinerary 111E may be generated based on itinerary 111D. In one embodiment, the changes may be presented to the second user, and user input may be solicited from the second user to accept or reject the changes with respect to the cloned (and customized) itinerary 111D.

Figure 6A:
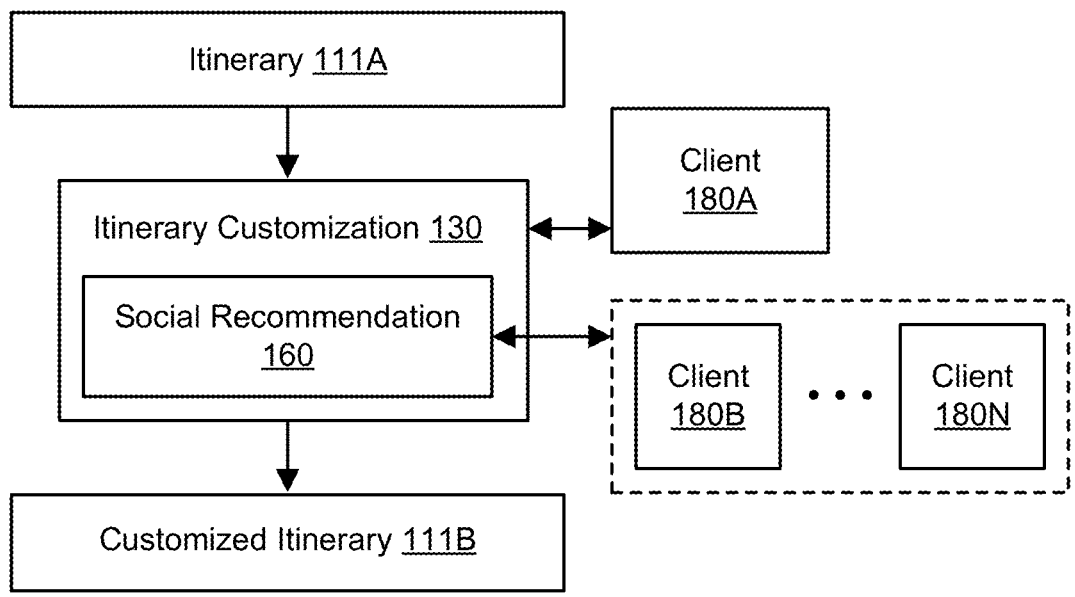
FIG. 6A illustrates customization of itineraries for travel planning based on social recommendations from other clients, according to one embodiment.

FIG. 6A illustrates customization of itineraries for travel planning based on social recommendations from other clients, according to one embodiment. Using a social recommendation functionality 165, sources of input other than a single, primary user may be used to customize an itinerary. As shown in FIG. 6A, for example, users represented by clients 180B through 180N may provide input to the generation of a customized itinerary 111B. The input from clients 180B-180N may be referred to as social input. In various embodiments, the social input from clients 180B-180N may either supplement or substitute for input from a primary user represented by client 180A. The social input may represent recommendations for the customization of itineraries, such as the selection of alternative trip components, the selection of a duration or particular date and time for one or more trip components, the selection of a duration or particular dates and times for the itinerary, the selection of alternative locations for the itinerary, and/or any other suitable options or parameters. In one embodiment, the social input may be collected and applied to the customization process through automated voting, e.g., using a social network interface or other programmatic interface to collect votes from other users. In one embodiment, votes may be weighted based on trust scores. The social input may also be referred to as recommendation input.

Figure 6B:
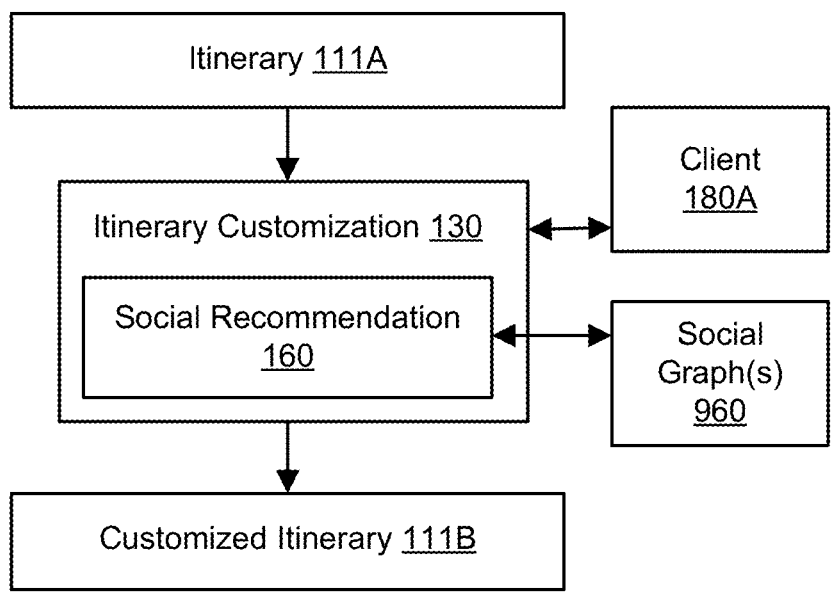
FIG. 6B illustrates customization of itineraries for travel planning based on social recommendations from a social graph, according to one embodiment.

FIG. 6B illustrates customization of itineraries for travel planning based on social recommendations from a social graph, according to one embodiment. Users in one or more social graphs 960 may provide input to the generation of a customized itinerary 111B. The other users may be connected to the primary user (represented by the client 180A) in the social graph(s) 960. The social input may be obtained programmatically and/or automatically through the social graph(s) 960. In various embodiments, the social input from the social graph(s) 960 may either supplement or substitute for input from a primary user represented by client 180A. The social input may represent recommendations for the customization of itineraries, such as the selection of alternative trip components, the selection of a duration or particular date and time for one or more trip components, the selection of a duration or particular dates and times for the itinerary, the selection of alternative locations for the itinerary, and/or any other suitable options or parameters. In one embodiment, the social input may be collected and applied to the customization process through automated voting, e.g., using a social network interface or other programmatic interface to collect votes from other users. In one embodiment, votes may be weighted based on trust scores. The social input may also be referred to as recommendation input.

Figure 7:
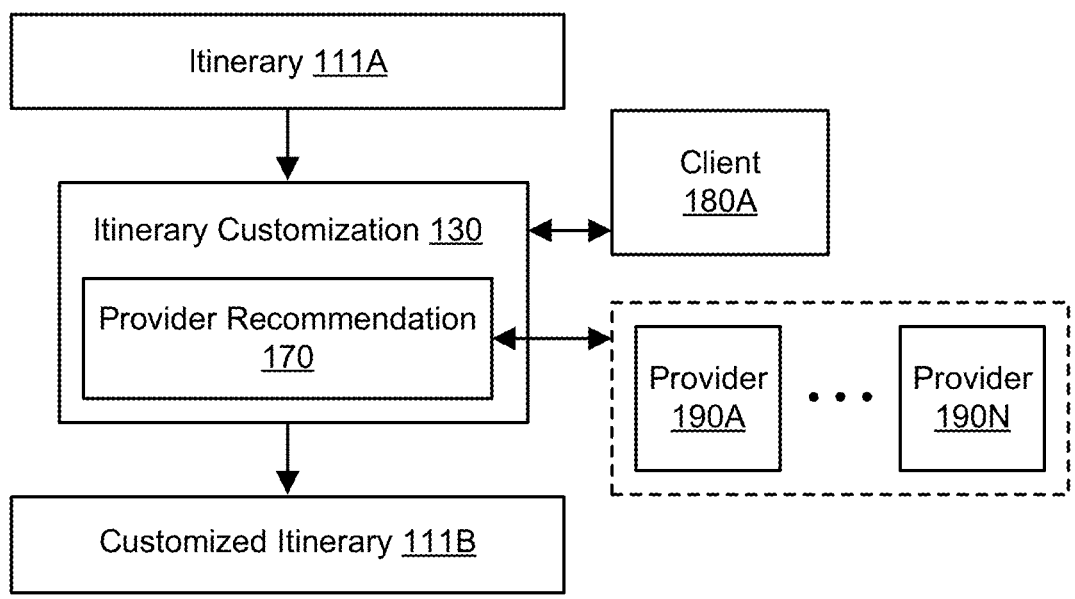
FIG. 7 illustrates customization of itineraries for travel planning based on recommendations from providers, according to one embodiment.

FIG. 7 illustrates customization of itineraries for travel planning based on recommendations from providers, according to one embodiment. Using a provider recommendation functionality 170, sources of input other than a single, primary user may be used to customize an itinerary. As shown in FIG. 7, for example, providers 190A through 190N may provide input to the generation of a customized itinerary 111B. The input from providers 190A-190N may be referred to as provider input. In various embodiments, the provider input may either supplement or substitute for input from a primary user represented by client 180A. In one embodiment, providers may propose or recommend changes or other customizations to an itinerary. For example, a hotel provider may recommend a change in dates for a hotel check-in to offer a reduced price. Accordingly, the provider input may represent recommendations for the customization of itineraries, such as the selection of alternative trip components, the selection of a duration or particular date and time for one or more trip components, the selection of a duration or particular dates and times for the itinerary, the selection of alternative locations for the itinerary, and/or any other suitable options or parameters. A notification of the proposed changes may be presented to a user, and user input may be solicited to accept or reject the proposed changes with respect to one or more particular itineraries that are owned or managed by one or more user(s) (e.g., the user represented by client 180A). The provider input may also be referred to as recommendation input. In one embodiment, a subscription interface may permit providers 190A-190N of travel services to add itineraries or trip components to the repository, surface itineraries or trip components for users, modify itineraries or trip components in the repository, provide recommendations to users for itineraries or trip components, and other suitable options. The provider interface 195 may include or implement the subscription interface, e.g., as an application programming interface (API) or other programmatic interface.

Figure 8:
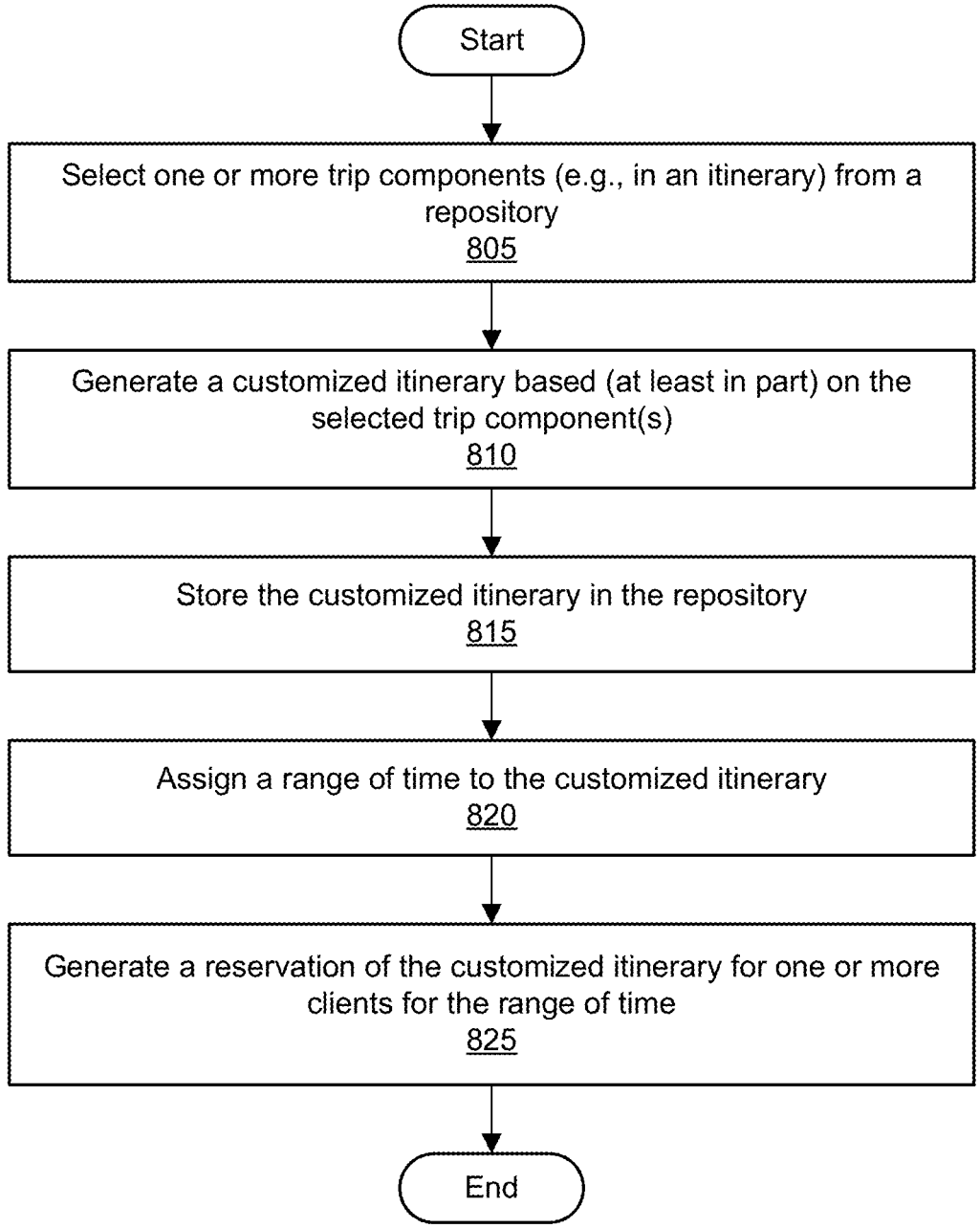
FIG. 8 is a flowchart illustrating a method for implementing a repository of customizable itineraries for travel planning, according to one embodiment.

FIG. 8 is a flowchart illustrating a method for implementing a repository of customizable itineraries for travel planning, according to one embodiment. As shown in 805, a set of one or more trip components may be selected from a repository. The trip components may be part of one or more itineraries or may be independent of an itinerary. In one embodiment, a particular itinerary that includes the trip components may be selected from a repository of itineraries. The repository of itineraries may include a plurality of predefined itineraries and/or user-customized itineraries and a plurality of trip components. For example, the predefined itineraries may be supplied by providers including travel agents, travel guides, and/or other experts. The trip components may represent a plurality of events and/or a plurality of locations. The locations may be distributed over geographical areas of varying size, from a relatively small area (such as a single town or city) to a relatively large one (such as one or more nations or continents). The trip components may be distributed over time (e.g., hours or days), each trip component may have a duration, and the particular itinerary may include a chronological order for the set of trip components. The itinerary repository or another suitable repository may also store trip components. At least some of the trip components may be supplied by providers, including travel agents, travel guides, event providers, lodging providers, transportation providers, and/or other providers of underlying services. In one embodiment, the particular itinerary and/or trip components may be selected based (at least in part) on user input. For example, the user may browse itineraries and/or trip components in a set of named travel categories or search for types of events, types of locations, specific events, or specific locations. At least a portion of the itineraries and/or trip components in the repository may be tagged or otherwise classified in various travel categories for convenient browsing and/or searching.

As shown in 810, a customized itinerary may be generated based (at least in part) on the selected trip components and/or selected itinerary. The customized itinerary may include one or more user-selected modifications to the chronological order. The customized itinerary may include one or more user-selected substitutions to the set of trip components, one or more added components, and/or one or more deleted components. One or more user-selected substitutions to the set of trip components may be selected from a repository of trip components (potentially the same repository that stores itineraries). The customized itinerary may include a user-selected modification to the duration, starting time, and/or ending time of a trip component. The customized itinerary may include one or more user-selected modifications to one or more parameters of a trip component. In one embodiment, the customized itinerary may represent a composite itinerary that is generated based on a plurality of itineraries, e.g., based on user input to combine different portions of the plurality of itineraries. In one embodiment, the particular itinerary may be customized based (at least in part) on user input, e.g., input from the user who selected the itinerary and/or input from one or more additional users who are identified as potential participants in the itinerary. As shown in 815, the customized itinerary may be stored in the repository of itineraries.

As shown in 820, a particular range of time may be assigned to the customized itinerary. The particular range of time may include a specific starting date and time and a specific ending date and time. In one embodiment, the particular range of time may be assigned to the customized itinerary based (at least in part) on user input, e.g., input from the user who selected or customized the itinerary and/or input from one or more additional users who are identified as potential participants in the itinerary.

As shown in 825, the customized itinerary may be booked by generating a reservation of the customized itinerary for one or more clients for the particular range of time. The client(s) may include the user who selected or customized the itinerary and/or one or more additional users who are identified as potential participants in the itinerary. The reservation may include an agreement by the one or more clients to purchase at least a portion of the customized itinerary. The reservation may be booked through one or more providers, including travel agents, travel guides, event providers, lodging providers, transportation providers, and/or other providers of underlying services. The providers participating in the booking may be structured in a plurality of levels or tiers, such that one provider may act as a travel agent or travel guide to package a set of trip components (e.g., representing events and/or services) to clients and then arrange for payment with one or more other providers who actually provide the events and/or services. The customized itinerary may be booked using one or more payment services of any suitable type.

In one embodiment, an aggregate risk score may be determined for the customized itinerary, e.g., for the particular range of time. The aggregate risk score may represent an estimation of success for the customized itinerary for the particular range of time. The aggregate risk score may be determined based at least in part on respective risk scores for individual ones of the set of trip components for the particular range of time.

In one embodiment, the customized itinerary may be duplicated and further customized by the same user or one or more additional users. To duplicate the customized itinerary, it may be selected from the repository of itineraries, and a copy of the customized itinerary may be generated. A customized copy may then be generated based on user input. For example, the customized copy may include one or more user-selected modifications to the chronological order; one or more user-selected substitutions to the set of trip components; one or more added components; one or more deleted components; a user-selected modification to the duration, starting time, and/or ending time of a trip component; and/or one or more user-selected modifications to one or more parameters of a trip component. The customized copy may be stored in the repository of itineraries and may also be duplicated and further customized. A range of time (including a specific starting date and time and a specific ending date and time) may be assigned to the customized copy, and the customized copy of the customized itinerary (representing a further customized itinerary) may be booked by generating a reservation for one or more clients for the range of time.

An original itinerary may be customized, managed, or otherwise designated as owned by a first user, and a copy of that original itinerary may be customized, managed, or otherwise designated as owned by a second user. If the second user customizes her or his copy, a notification of the changes may be sent automatically to the first user. In one embodiment, the changes may be presented to the first user, and the first user may enter user input to accept or reject the changes with respect to the original itinerary. Similarly, if the original itinerary is customized (or further customized) after the copy is made, a notification of the changes may be sent automatically to the second user. In one embodiment, the changes may be presented to the second user, and the second user may enter user input to accept or reject the changes with respect to the copy of the itinerary. In one embodiment, a user may select or enable a privacy profile that may allow or deny the copying of private trip components and/or private itineraries by particular other users and/or groups of users. Accordingly, based (at least in part) on a privacy profile and/or any suitable privacy mechanisms, trip components designated as private may be excluded from a copy of an itinerary made by another user.

In one embodiment, sources of input other than a single, primary user may be used to customize an itinerary. In one embodiment, social input from one or more other users may be used to customize an itinerary. The other users may be connected to the primary user in a social graph, and the social input may be obtained programmatically and/or automatically through the social graph. The social input may represent recommendations for the customization of itineraries, such as the selection of alternative trip components, the selection of a duration or particular date and time for one or more trip components, the selection of a duration or particular dates and times for the itinerary, the selection of alternative locations for the itinerary, and/or any other suitable options or parameters. In one embodiment, the social input may be collected and applied to the customization process through automated voting, e.g., using a social network interface to collect votes from other users. In one embodiment, votes may be weighted based on trust scores. In one embodiment, providers may propose or recommend changes or other customizations to an itinerary. For example, a hotel provider may recommend a change in dates for a hotel check-in to offer a reduced price. A notification of the proposed changes may be presented to a user, and user input may be solicited to accept or reject the proposed changes with respect to one or more particular itineraries that are owned or managed by one or more user(s).

Trust-Based Social Graph for Travel Planning

Figure 9:
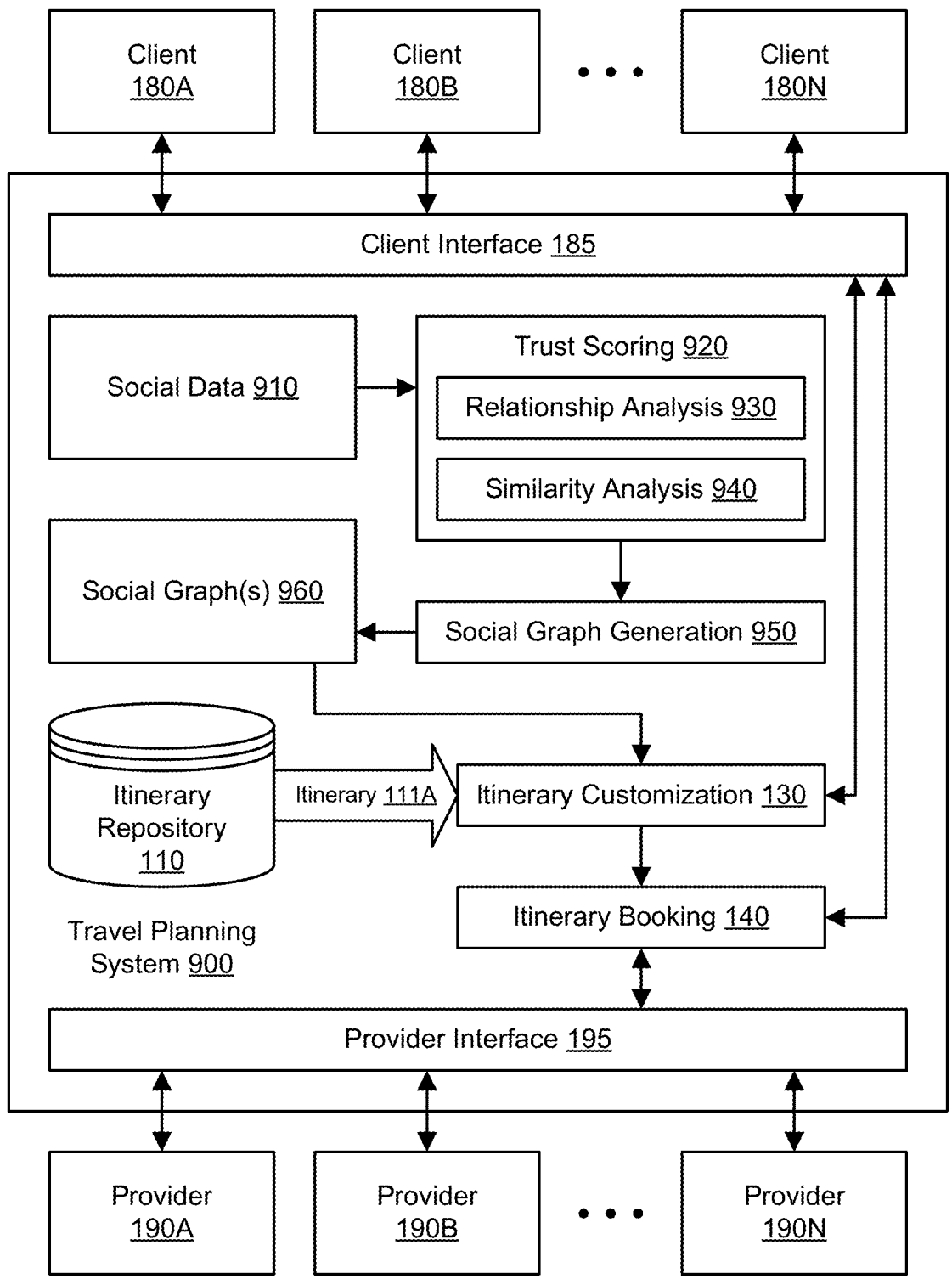
FIG. 9 illustrates an example system environment for implementing a trust-based social graph for travel planning, according to one embodiment.

FIG. 9 illustrates an example system environment for implementing a trust-based social graph for travel planning, according to one embodiment. A travel planning system 900 may include a plurality of modules, components, or other elements of functionality that implement the creation and maintenance of one or more trust-based social graphs 960. In one embodiment, the travel planning system 900 may include a trust scoring functionality 920 and a social graph generation functionality 950. The social graph(s) 960 created and modified by the social graph generation functionality 950 may be used to assist in travel planning, e.g., through the customization of itineraries. Accordingly, the travel planning system 900 may also include a plurality of modules, components, or other elements of functionality that implement the selection, customization, and booking of itineraries using an itinerary repository 110. In one embodiment, the travel planning system 900 may include an itinerary selection functionality 120 (not shown), an itinerary customization functionality 130, and an itinerary booking functionality 140. As discussed above with respect to FIG. 1, the itinerary selection functionality 120, itinerary customization functionality 130, and itinerary booking functionality 140 may be responsive to user input to perform various tasks related to travel planning using the itinerary repository 110. Using the client interface 185 as discussed above with respect to FIG. 1, the travel planning system 900 may interact with a plurality of clients such as clients 180A-180N. Using the provider interface 195 as discussed above with respect to FIG. 1, the travel planning system 900 may interact with a plurality of providers such as providers 190A-190N. The travel planning system 900 may represent a service with which the clients 180A-180N and/or providers 190A-190N may interact, e.g., using one or more programmatic interfaces or APIs. For example, the clients 180A-180N and/or providers 190A-190N may subscribe to the service in order to facilitate the building or modification of one or more social graphs 960.

Turning back to FIG. 9, the travel planning system 900 may obtain and/or generate social data 910. Elements of the social data 910 may be obtained for a particular user account and for a plurality of additional accounts. The accounts may represent entities such as individual users, groups of users, experts, and/or other suitable entities such as organizations. The social data 910 may be obtained from any suitable sources, including direct user input (e.g., using the clients 180A-180N), one or more external social graphs, and/or other accounts (e.g., at online merchants or other online services) owned by the same user. The social data 910 may include indications of relationships between entities, indications of types of relationships between entities (e.g., indications of family relationships, friend relationships, co-worker relationships, and so on), photos that may be relevant to the trust-based social graph, videos that may be relevant to the trust-based social graph, textual elements that may be relevant to the trust-based social graph, indications of travel history or travel preferences, indications of purchase history or purchase preferences, and/or any other data suitable for building or curating a trust-based social graph.

Using the trust scoring functionality 920, trust scores may be determined for the plurality of additional accounts with respect to the particular user account. For one of the additional accounts, the trust score may be determined based (at least in part) on a relationship score and a similarity score for the additional account. The trust scoring functionality 920 may implement relationship analysis 930 of the social data 910 to determine relationship scores. For one of the additional accounts, the relationship score may represent the strength of a relationship with the particular user account. In one embodiment, a relationship score may be determined based (at least in part) on the existence (or lack thereof) and/or type of relationship between the particular user account and one of the additional accounts. The trust scoring functionality 920 may implement similarity analysis 940 of the social data 910 to determine similarity scores. For one of the additional accounts, the similarity score may represent a similarity of interests or preferences (e.g., for travel) with respect to the particular user account. In one embodiment, a similarity score may be determined based (at least in part) on an automated analysis of one or more photos, one or more videos, one or more textual elements, one or more indications of travel history or travel preferences, one or more indications of purchase history or purchase preferences, or other data corresponding to one of the additional accounts. Accordingly, both the relationship strength and the similarity of interests or preferences (e.g., for travel) may be reflected in the trust scoring 920 between two accounts.

Using the social graph generation functionality 950, the social graph(s) 960 may be created or updated based on the trust scoring 920. In one embodiment, of the additional accounts analyzed with respect to the particular user account, those having a trust score that satisfies a particular threshold may be considered trusted accounts with respect to the particular user account. Accordingly, one or more connections in the social graph(s) 960 may be generated between the particular user account and one or more trusted accounts. The one or more connections between the particular user account and the trusted accounts may be generated based (at least in part) on the trust scores. Any of the accounts may or may not already be represented by nodes in the social graph(s) 960. In one embodiment, one or more connections in the social graph(s) 960 may be recommended to the particular user account and then created in response to user input accepting the recommendation(s). In one embodiment, one or more connections in the social graph(s) 960 may created automatically, e.g., without direct user input accepting any recommendation(s).

In various embodiments, an itinerary for the particular user account may be modified (as discussed above with respect to FIG. 3, for example) based (at least in part) on social input obtained using the connections with the one or more trusted accounts in the social graph(s) 960. The social input may be obtained programmatically and/or automatically through the social graph(s) 960. The social input may represent recommendations for the customization of itineraries, such as the selection of alternative trip components, the selection of a duration or particular date and time for one or more trip components, the selection of a duration or particular dates and times for the itinerary, the selection of alternative locations for the itinerary, and/or any other suitable options or parameters. In one embodiment, the social input may be collected and applied to the customization process through automated voting, e.g., using a social network interface to collect votes from other users. In one embodiment, votes may be weighted based on trust scores. The modifications may be determined based on automated analysis of travel data (e.g., travel-related photos, travel-related videos, travel-related text, travel-related purchase history and purchase preferences, and other travel history and travel preferences) from the one or more trusted accounts. In one embodiment, modifications based on travel data may be recommended to the particular user account and then entered to an itinerary based (at least in part on) user input representing an acceptance of the one or more modifications in the recommendation.

The travel planning system 900 may comprise one or more computing devices, any of which may be implemented by the example computing device 5000 illustrated in FIG. 18. In various embodiments, portions of the functionality of the travel planning system 900 may be provided by the same computing device or by any suitable number of different computing devices. If any of the components of the travel planning system 100 (such as the trust scoring functionality 920, social graph generation functionality 950, social graph(s) 960, itinerary repository 110, itinerary customization functionality 130, and itinerary booking functionality 140) are implemented using different computing devices, then the components and their respective computing devices may be communicatively coupled, e.g., via a network. Each of the illustrated components (such as the trust scoring functionality 920, social graph generation functionality 950, social graph(s) 960, itinerary repository 110, itinerary customization functionality 130, and itinerary booking functionality 140) may represent any combination of software and hardware usable to perform their respective functions.

It is contemplated that the travel planning system 900 may include additional components not shown, fewer components than shown, or different combinations, configurations, or quantities of the components shown. For example, although three clients 180A, 180B, and 180N are shown for purposes of example and illustration, it is contemplated that different quantities and configurations of clients may be used with the travel planning system 900. Additionally, although three providers 190A, 190B, and 190N are shown for purposes of example and illustration, it is contemplated that different quantities and configurations of providers may be used with the travel planning system 900.

In some embodiments, travel planning system 900, clients 180A-180N, and/or providers 190A-190N may be implemented using virtual compute instances and/or physical compute instances. The virtual compute instances and/or physical compute instances may be offered to clients, provisioned, and maintained by a provider network that manages computational resources, memory resources, storage resources, and network resources. A virtual compute instance may comprise one or more servers with a specified computational capacity (which may be specified by indicating the type and number of CPUs, the main memory size, and so on) and a specified software stack (e.g., a particular version of an operating system, which may in turn run on top of a hypervisor). One or more virtual compute instances may be implemented by the example computing device 5000 illustrated in FIG. 18.

In one embodiment, the travel planning system 900 may select and/or provision virtual compute instances for implementing the various components of the travel planning system (such as the trust scoring functionality 920, social graph generation functionality 950, social graph(s) 960, itinerary repository 110, itinerary customization functionality 130, and itinerary booking functionality 140). For example, the virtual compute instances may be provisioned from a suitable pool of available computing instances. In one embodiment, additional computing instances may be added to the travel planning system 900 as needed. In one embodiment, computing instances may be returned to the pool of available computing instances if the computing instances are not needed at a particular point in time. In one embodiment, the functionality of the travel planning system 900 may be provided to clients 180A-180N and/or providers 190A-190N using a provider network. For example, the functionality of the travel planning system 900 may be presented to clients and/or providers as a web-accessible service.

Figure 10:
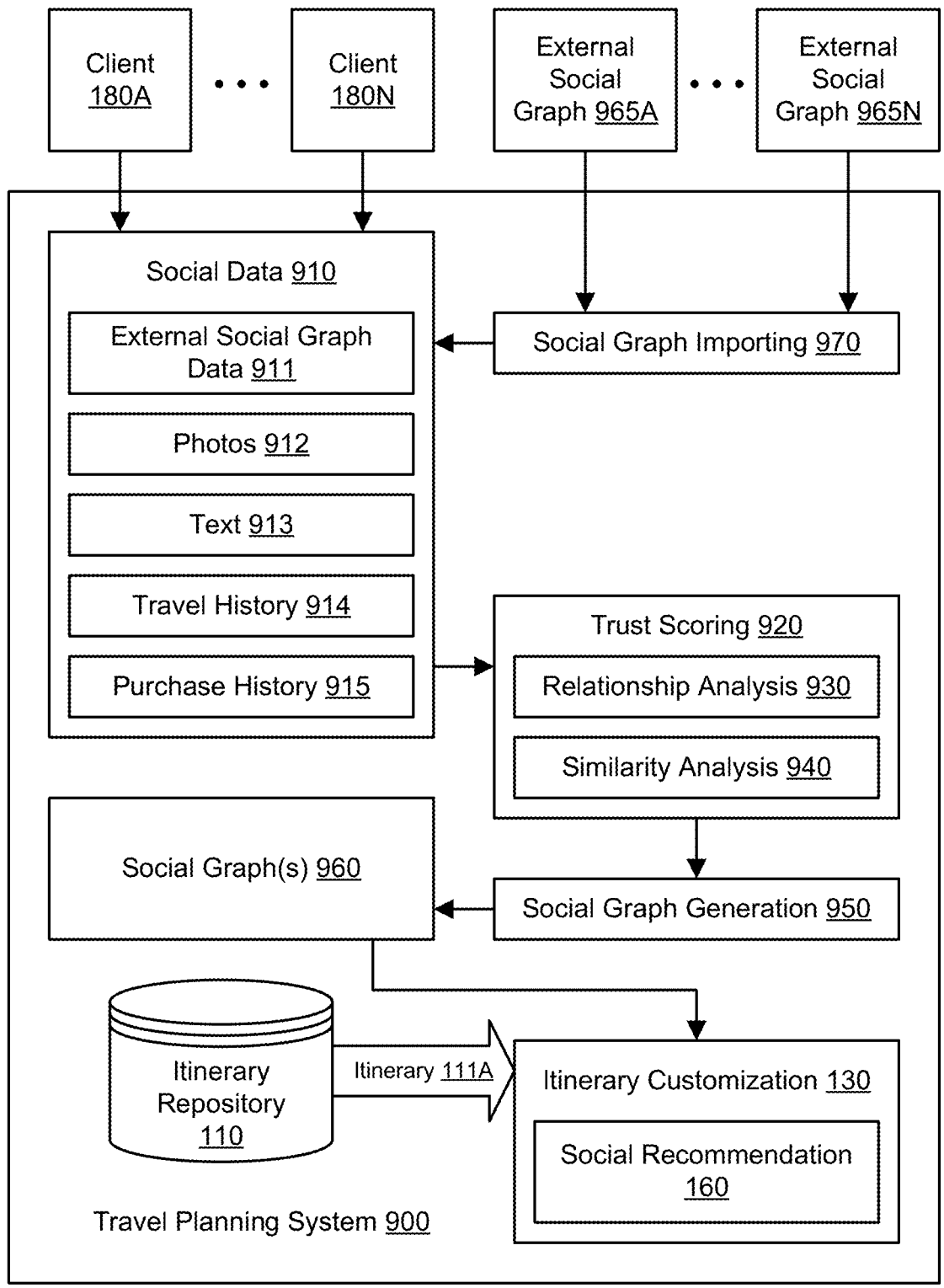
FIG. 10 illustrates further aspects of the example system environment for implementing a trust-based social graph for travel planning, including social graph importing, according to one embodiment.

FIG. 10 illustrates further aspects of the example system environment for implementing a trust-based social graph for travel planning, including social graph importing, according to one embodiment. In one embodiment, the travel planning system 900 may include a social graph importing functionality 970. The social graph importing functionality 970 may collect elements of the social data 910 from one or more external social graphs, such as external social graphs 965A through 965N. The external social graphs 965A-965N may be operated or maintained by an entity other than the entity that operates or maintains the travel planning system 900. The external social graphs 965A-965N may represent a variety of social network services, e.g., web-accessible social networks that link users to one another and permit the sharing of various types of data. The social graph importing functionality 970 may use any suitable interfaces and/or interconnections, such as programmatic interfaces or APIs, to collect elements of the social data 910 from the external social graphs 965A-965N. In one embodiment, the social graph importing functionality 970 may collect elements of the social data 910 from any of the external social graphs 965A-965N on behalf of a particular user account that is also represented by one or more nodes in the external social graph(s), and it may do so with explicit permission from that user account (e.g., by the user supplying login credentials for the corresponding accounts in the external social graph(s)).

Elements of the social data 910 may be obtained from a variety of sources, potentially including direct user input (e.g., using the clients 180A-180N), one or more external social graphs 965A-965N, and/or other accounts (e.g., at online merchants or other online services) owned by or associated with a particular user. For example, the social data 910 may include external social graph data 911 sourced from one or more external social graphs 965A-965N. The external social graph data 911 may include indications of relationships between entities and/or indications of types of relationships between entities (e.g., indications of family relationships, friend relationships, co-worker relationships, and so on). The social data 910 may include photos 912 that may be relevant to the trust-based social graph as well as videos that may be relevant to the trust-based social graph. The photos and videos may be associated with location data and/or other suitable metadata for indicating travel preferences. The social data 910 may include textual elements 913 that may be relevant to the trust-based social graph, such as posts and messages from external social graphs 965A-965N, reviews of products made at online merchants, searches entered into a browser, and so on. The social data 910 may include indications of travel history or travel preferences 914, such as previously booked itineraries, elements of browser history, or other indications of travel preferences. The social data 910 may include indications of purchase history or purchase preferences 915, e.g., as sourced from online merchants or from social media posts.

Figure 11A:
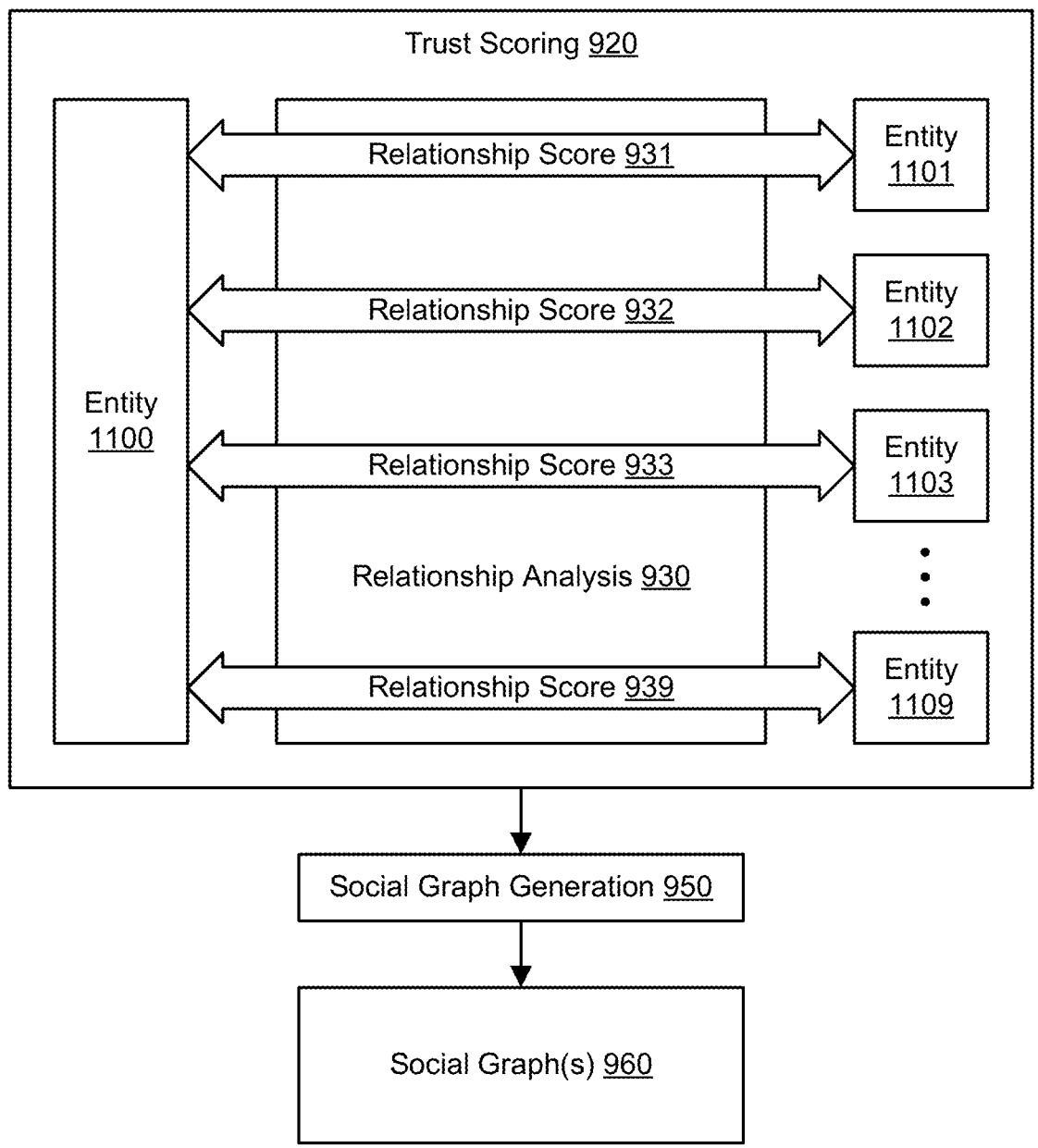
FIG. 11A illustrates the use of relationship analysis for generating a trust-based social graph for travel planning, according to one embodiment.

FIG. 11A illustrates the use of relationship analysis for generating a trust-based social graph for travel planning, according to one embodiment. The trust scoring functionality 920 may perform relationship analysis 930 for a particular entity 1100 with respect to other entities such as entity 1101, entity 1102, and entity 1103 through entity 1109. Although five entities 1100-1109 are shown for purposes of illustration and example, it is contemplated that any suitable number and configuration of entities may be used. The entities 1100-1109 may represent individual users, groups of users, experts, and/or organizations. Based (at least in part) on social data 910, the relationship analysis 930 may determine a relationship score between the primary entity 1100 and any of the other entities 1101-1109. As shown in the example of FIG. 11A, the relationship analysis 930 may determine a relationship score 931 between the primary entity 1100 and the entity 1101, a relationship score 932 between the primary entity 1100 and the entity 1102, a relationship score 933 between the primary entity 1100 and the entity 1103, and a relationship score 939 between the primary entity 1100 and the entity 1109. Each of the relationship scores 931-939 may represent the existence and strength of a relationship between the primary entity 1100 and the corresponding one of the entities 1101-1109. In one embodiment, the relationship scores may be generated within a range of values (e.g., 0 to 1).

Figure 11B:
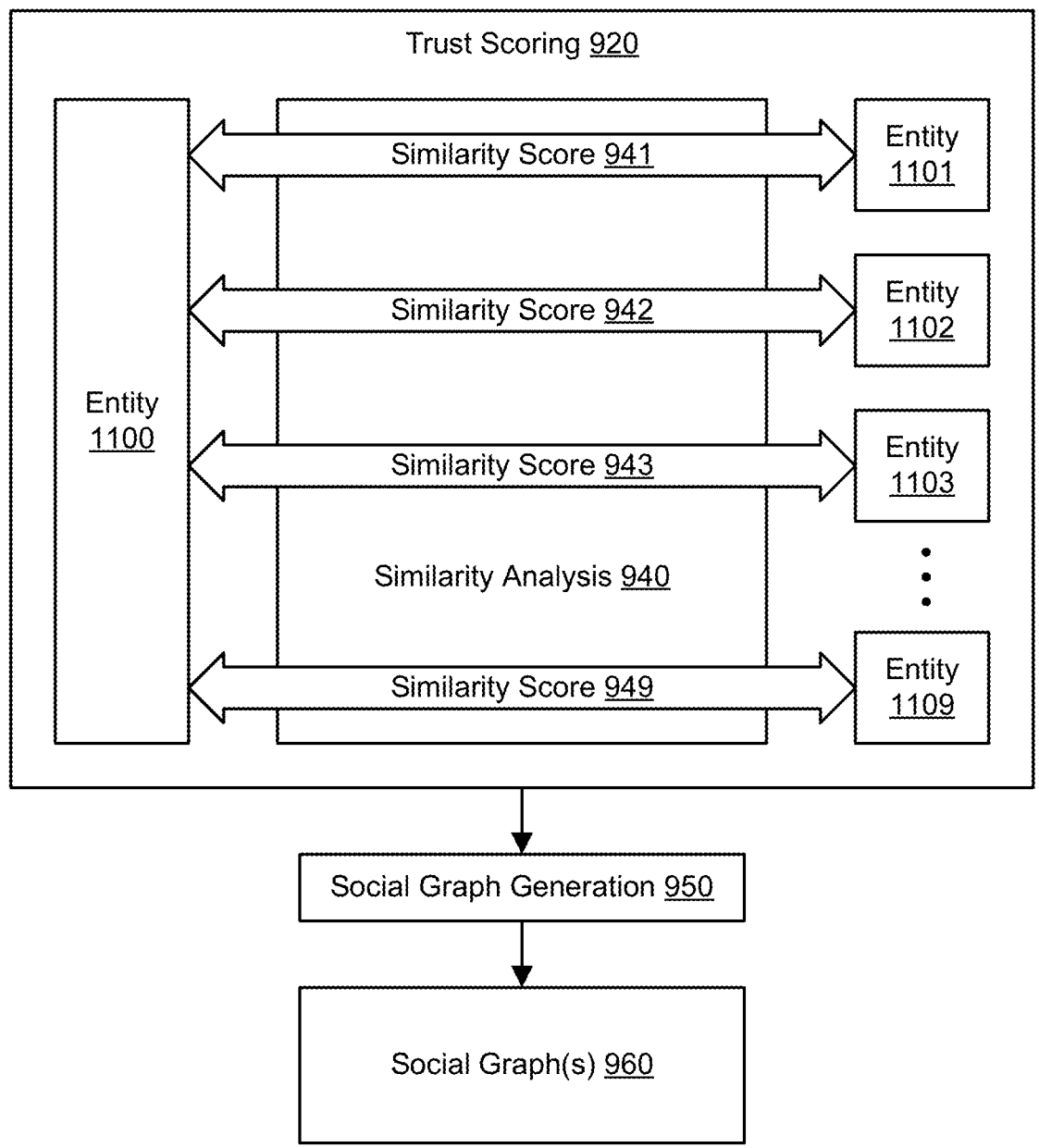
FIG. 11B illustrates the use of similarity analysis for generating a trust-based social graph for travel planning, according to one embodiment.

FIG. 11B illustrates the use of similarity analysis for generating a trust-based social graph for travel planning, according to one embodiment. The trust scoring functionality 920 may perform similarity analysis 940 for the particular entity 1100 with respect to other entities such as entity 1101, entity 1102, and entity 1103 through entity 1109. The entities 1100-1109 may represent individual users, groups of users, experts, and/or organizations. Based (at least in part) on social data 910, the similarity analysis 940 may determine a similarity score between the primary entity 1100 and any of the other entities 1101-1109. As shown in the example of FIG. 11B, the similarity analysis 940 may determine a similarity score 941 between the primary entity 1100 and the entity 1101, a similarity score 942 between the primary entity 1100 and the entity 1102, a similarity score 943 between the primary entity 1100 and the entity 1103, and a similarity score 949 between the primary entity 1100 and the entity 1109. Each of the similarity scores 941-949 may represent the strength of a similarity of travel interests and/or travel preferences between the primary entity 1100 and the corresponding one of the entities 1101-1109. In one embodiment, the similarity scores may be generated within a range of values (e.g., 0 to 1).

Figure 11C:
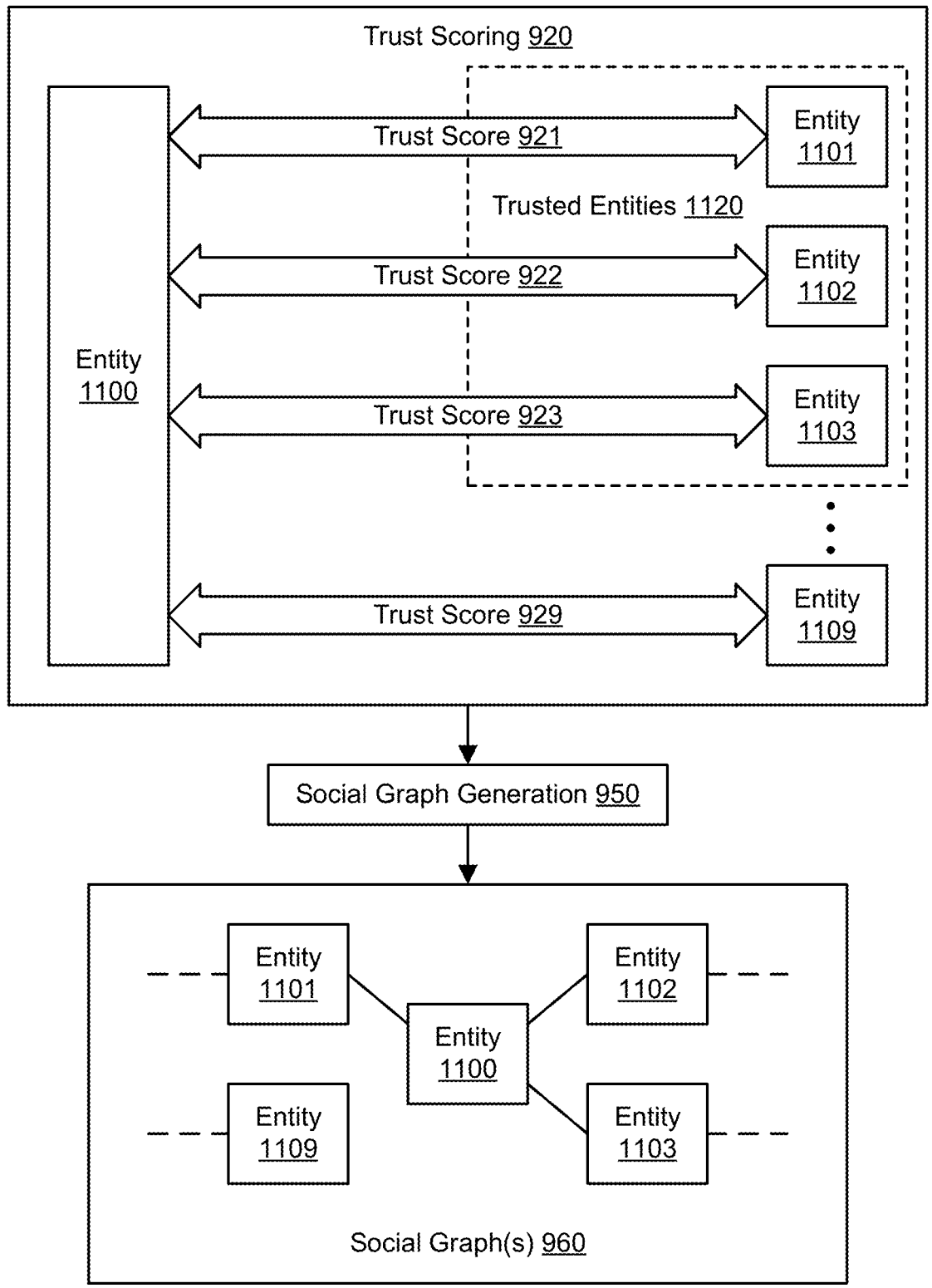
FIG. 11C illustrates the use of trust scoring based on relationship analysis and similarity analysis for generating a trust-based social graph for travel planning, according to one embodiment.

FIG. 11C illustrates the use of trust scoring based on relationship analysis and similarity analysis for generating a trust-based social graph for travel planning, according to one embodiment. Based on the relationship scores 931-939 and the similarity scores 941-949, the trust scoring functionality 920 may determine a similarity score between the primary entity 1100 and any of the other entities 1101-1109. As shown in the example of FIG. 11C, the trust scoring functionality 920 may determine a trust score 921 between the primary entity 1100 and the entity 1101, a trust score 922 between the primary entity 1100 and the entity 1102, a trust score 923 between the primary entity 1100 and the entity 1103, and a trust score 929 between the primary entity 1100 and the entity 1109. Each of the trust scores 921-929 may represent both the existence and strength of a relationship between the primary entity 1100 and the corresponding one of the entities 1101-1109 and the strength of a similarity of travel interests and/or travel preferences between the primary entity 1100 and the corresponding one of the entities 1101-1109. In one embodiment, the trust scores may be generated within a range of values (e.g., 0 to 1).

In one embodiment, some entities may have trust modifiers to indicate a high level of expertise on travel-related matters. Entities with expertise and intrinsically high trust may include travel agents, travel guides, other experts, and providers of underlying services, including business entities and other organizations. Entities with high degrees of expertise may be scored with higher trust scores as a result of the trust modifier. In one embodiment, the expertise may be assigned to entities as a result of social input, e.g., from indications of trust observed in a social graph.

Of the other entities 1101-1109, those having a trust score that satisfies a particular threshold may be considered trusted entities 1120 with respect to the primary entity 1100. As shown in the example of FIG. 11C, the entities 1101, 1102, and 1103 may have trust scores (with respect to entity 1100) that qualifies them as trusted entities; however, the trust score 929 for the other entity 1109 may be too low for the entity to qualify as trusted with respect to entity 1100. Using the social graph generation functionality 950, connections in social graph(s) 960 may be generated between the entity 1100 and one or more trusted entities 1101, 1102, and 1103 but not between the entity 1100 and the entity 1109. Any of the entities 1100-1109 may or may not already be represented by nodes in the social graph(s) 960; if the corresponding nodes are not already present, they may be created. In one embodiment, any of the connections between the entity 1100 and the entities 1101, 1102, or 1103 may already be present in the social graph(s) 960; if the connections (or edges) are not already present, they may be created. As indicated in FIG. 11C, any of the entities 1101, 1102, 1103, and 1109 may have connections to entities other than entity 1100 in the social graph(s) 960. In one embodiment, one or more connections in the social graph(s) 960 may be recommended to the entity 1100 and then created in response to user input accepting the recommendation(s). In one embodiment, one or more connections in the social graph(s) 960 may created automatically, e.g., without direct user input accepting any recommendation(s). In one embodiment, existing connections may be removed from the trust-based social graph(s) 960 as trust scoring is performed again using updated social data 910.

Figure 12:
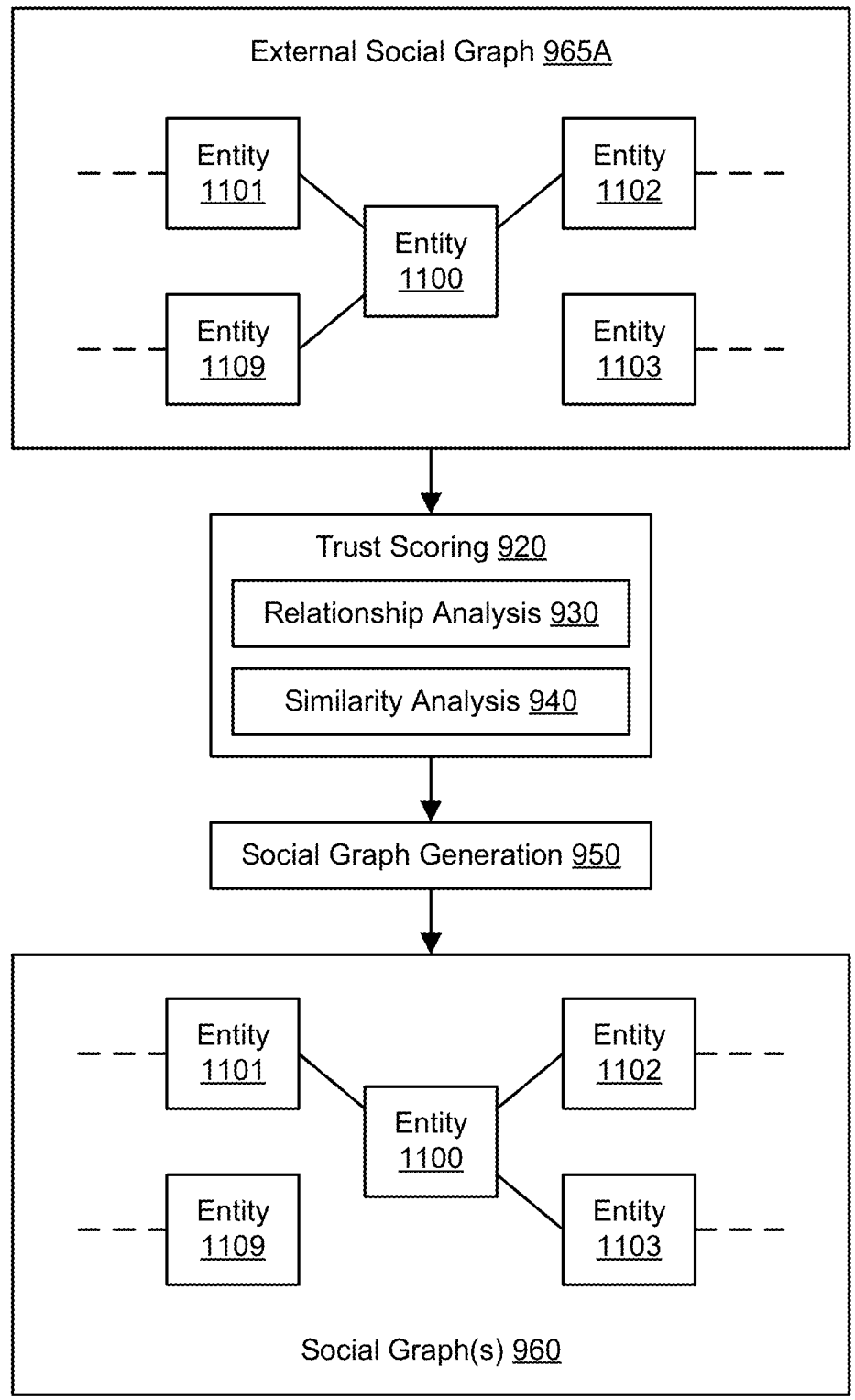
FIG. 12 illustrates the use of trust scoring based on relationship analysis and similarity analysis of an external social graph for generating a trust-based social graph for travel planning, according to one embodiment.

FIG. 12 illustrates the use of trust scoring based on relationship analysis and similarity analysis of an external social graph for generating a trust-based social graph for travel planning, according to one embodiment. In one embodiment, other entities that have no preexisting relationship with a particular entity (e.g., in one or more external social graphs) may be considered trusted entities based on a high similarity component of the trust score. As shown in the example of FIG. 12, the entity 1100 may not have a relationship with the entity 1103 in an external social graph 965A. However, similarity analysis may reveal that the similarity of travel interests or preferences is very high. Accordingly, the trust score between entity 1100 and entity 1103 may be high enough to offset the low relationship score and to result in a connection between the two entities in the trust-based social graph(s) 960. In one embodiment, a connection between two entities that have no preexisting relationship may be created only based on an affirmative acceptance of a recommendation by one or more of the entities and/or according to a privacy profile for one or more of the entities. Conversely, other entities that do have preexisting relationships with a particular entity (e.g., in one or more external social graphs) may be excluded from the trusted entities based on a low similarity component of the trust score. As shown in the example of FIG. 12, the entity 1100 may have a relationship with the entity 1109 in an external social graph 965A. However, similarity analysis may reveal that the similarity of travel interests or preferences is very low. Accordingly, the trust score between entity 1100 and entity 1109 may be too low to create a connection between the two entities in the trust-based social graph(s) 960.

Figure 13:
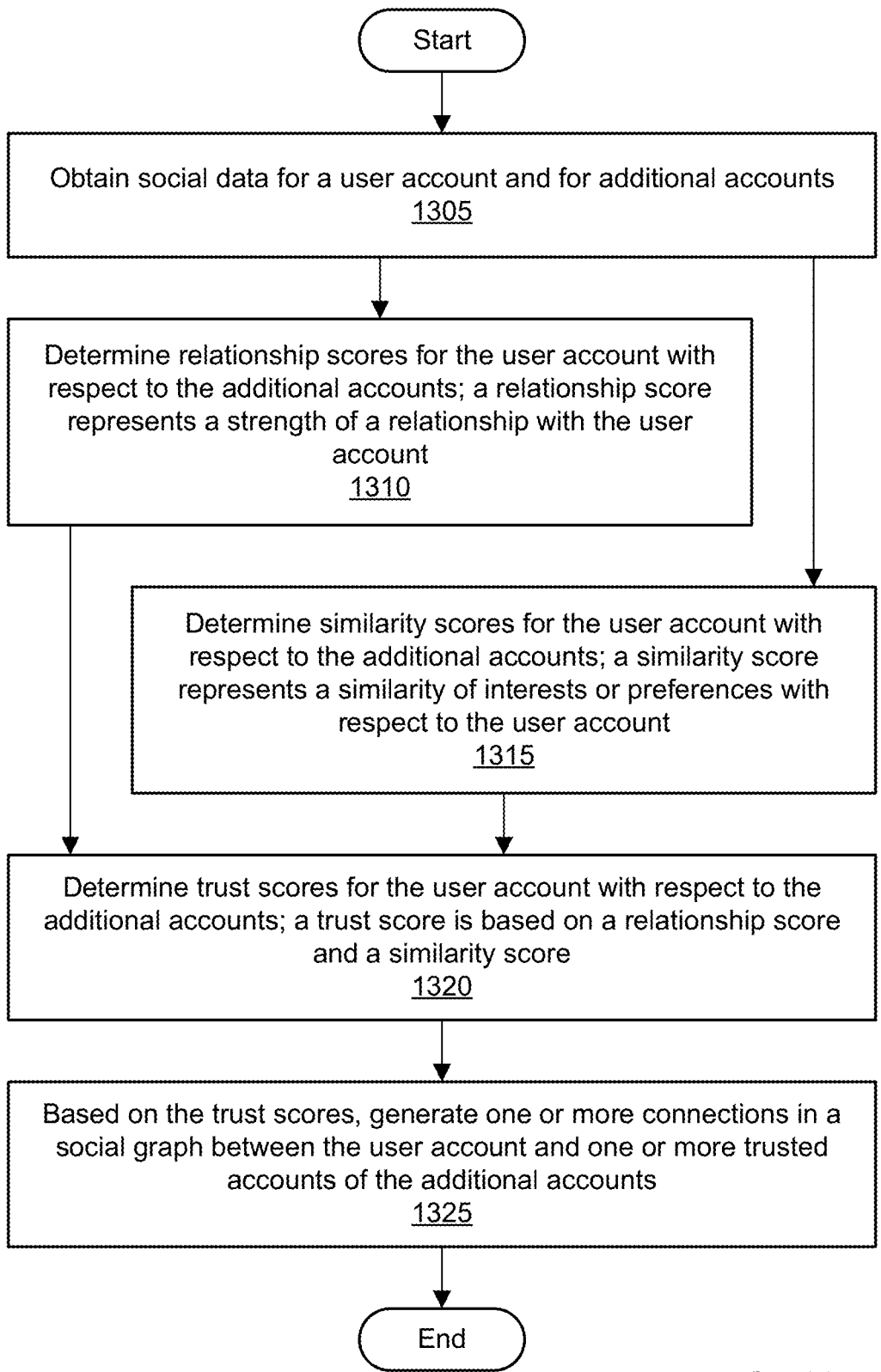
FIG. 13 is a flowchart illustrating a method for implementing a trust-based social graph for travel planning, according to one embodiment.

FIG. 13 is a flowchart illustrating a method for implementing a trust-based social graph for travel planning, according to one embodiment. As shown in 1305, social data may be obtained for a particular user account and for a plurality of additional accounts. The accounts may represent entities such as individual users, groups of users, experts, and/or other suitable entities such as organizations. The social data may be obtained from any suitable sources, including direct user input, one or more external social graphs, and/or other accounts (e.g., at online merchants or other online services) owned by the same user. The social data may include indications of relationships between entities, indications of types of relationships between entities (e.g., indications of family relationships, friend relationships, co-worker relationships, and so on), photos that may be relevant to the trust-based social graph, videos that may be relevant to the trust-based social graph, textual elements that may be relevant to the trust-based social graph, indications of travel history or travel preferences, indications of purchase history or purchase preferences, and/or any other data suitable for building or curating a trust-based social graph.

As shown in 1310, for the particular user account, respective relationship scores may be determined for a plurality of additional accounts. For one of the additional accounts, the relationship score may represent the strength of a relationship with the particular user account. The relationship scores may be determined using relationship analysis of the social data. In one embodiment, a relationship score may be determined based (at least in part) on the existence (or lack thereof) and/or type of relationship between the particular user account and one of the additional accounts.

As shown in 1315, for the particular user account, respective similarity scores may be determined for the plurality of additional accounts. For one of the additional accounts, the similarity score may represent a similarity of interests or preferences (e.g., for travel) with respect to the particular user account. The similarity scores may be determined using similarity analysis of the social data. In one embodiment, a similarity score may be determined based (at least in part) on an automated analysis of one or more photos, one or more videos, one or more textual elements, one or more indications of travel history or travel preferences, one or more indications of purchase history or purchase preferences, or other data corresponding to one of the additional accounts.

As shown in 1320, for the particular user account, respective trust scores may be determined for the plurality of additional accounts. For one of the additional accounts, the trust score may be determined based (at least in part) on the respective relationship score and the respective similarity score for the additional accounts. Accordingly, both the relationship strength and the similarity of interests or preferences (e.g., for travel) may be reflected in the trust score between two accounts.

Of the additional accounts, those having a trust score that satisfies a particular threshold may be considered trusted accounts with respect to the particular user account. As shown in 1325, one or more respective connections in a social graph may be generated between the particular user account and one or more trusted accounts. Accordingly, the one or more respective connections between the particular user account and the trusted accounts may be generated based (at least in part) on the trust scores. Any of the accounts may or may not already be represented by nodes in the social graph. In one embodiment, other accounts that have no preexisting relationship with the particular user account (e.g., in one or more external social graphs) may be considered trusted accounts based on a high similarity component of the trust score. Conversely, other accounts that do have preexisting relationships with the particular user account (e.g., in one or more external social graphs) may be excluded from the trusted accounts based on a low similarity component of the trust score. In one embodiment, one or more connections in the social graph may be recommended to the particular user account and then created in response to user input accepting the recommendation(s). In one embodiment, one or more connections in the social graph may created automatically, e.g., without direct user input accepting any recommendation(s).

In various embodiments, an itinerary for the particular user account may be modified (as discussed above with respect to FIG. 3, for example) based (at least in part) on social input obtained using the connections with the one or more trusted accounts in the social graph. The social input may be obtained programmatically and/or automatically through the social graph. The social input may represent recommendations for the customization of itineraries, such as the selection of alternative trip components, the selection of a duration or particular date and time for one or more trip components, the selection of a duration or particular dates and times for the itinerary, the selection of alternative locations for the itinerary, and/or any other suitable options or parameters. In one embodiment, the social input may be collected and applied to the customization process through automated voting, e.g., using a social network interface to collect votes from other users. In one embodiment, votes may be weighted based on trust scores. The modifications may be determined based on automated analysis of travel data (e.g., travel-related photos, travel-related videos, travel-related text, travel-related purchase history and purchase preferences, and other travel history and travel preferences) from the one or more trusted accounts. In one embodiment, modifications based on travel data may be recommended to the particular user account and then entered to an itinerary based (at least in part on) user input representing an acceptance of the one or more modifications in the recommendation.

Customizable Decision Recipes with Input from a Social Graph

Figure 14:
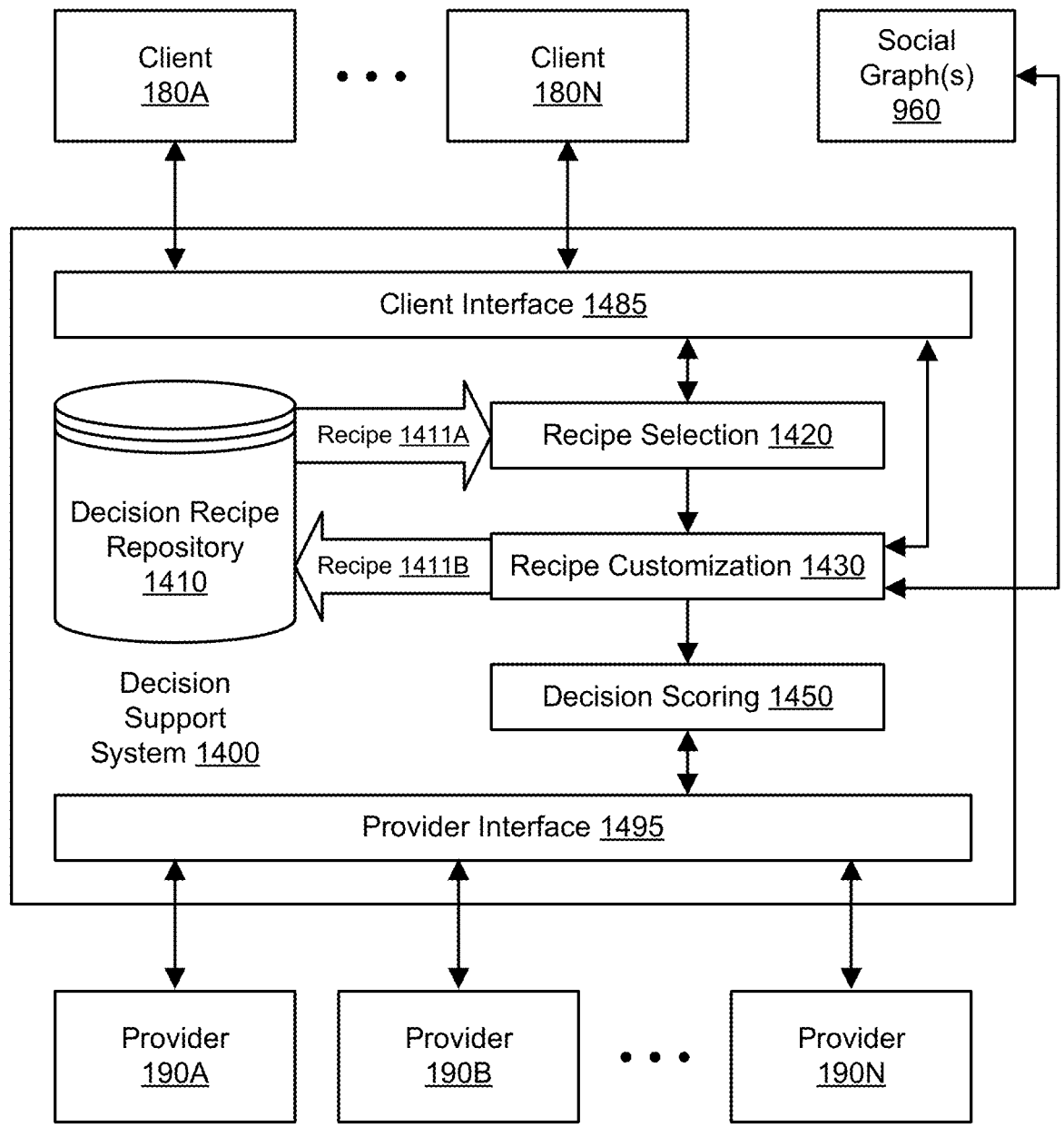
FIG. 14 illustrates an example system environment for implementing a repository of customizable decision recipes, according to one embodiment.

FIG. 14 illustrates an example system environment for implementing a repository of customizable decision recipes, according to one embodiment. A decision support system 1400 may include a plurality of modules, components, or other elements of functionality that implement the selection, customization, and scoring of decision recipes using a decision recipe repository 1410. In one embodiment, the decision support system 1400 may include a decision recipe selection functionality 1420, a decision recipe customization functionality 1430, and a decision recipe scoring functionality 1450. In one embodiment, the decision recipe selection functionality 1420, decision recipe customization functionality 1430, and decision recipe booking functionality 140 may be responsive to user input to perform various tasks related to decision evaluation using the decision recipe repository 1410.

Using a client interface 1485, the decision support system 1400 may interact with a plurality of clients such as clients 180A and 180B through 180N. The decision support system 1400 and clients 180A-180N may be communicatively coupled to one another using one or more suitable networks. The clients 180A-180N may represent various clients, users, client accounts, or user accounts. The clients 180A-180N may be implemented as computing instances, resources, processes, or any suitable combinations thereof. The client interface 1485 may implement one or more user interfaces and/or application programming interfaces (APIs) enabling clients to select decision recipes and/or decision components from the repository 1410, customize decision recipes and/or decision components, score decision recipes, book decision recipes and/or decision components, interact with other users (e.g., using social graph(s) 960), and perform other suitable tasks.

Using a provider interface 1495, the decision support system 1400 may interact with a plurality of providers such as providers 190A and 190B through 190N. The decision support system 1400 and providers 190A-190N may be communicatively coupled to one another using one or more suitable networks. The providers 190A-190N may represent various types of providers such as providers of underlying services in the decision recipes, agents, specialists, and/or other experts. The providers 190A-190N may be implemented as computing instances, resources, processes, or any suitable combinations thereof. In one embodiment, the providers 190A-190N may be structured in a plurality of levels or tiers, such that one provider may act as an agent to package a set of decision components (e.g., representing events and/or services) to clients and then arrange for payment with one or more other providers who actually provide the events and/or services. The provider interface 1495 may implement one or more application programming interfaces (APIs) enabling providers to submit decision recipes and/or decision components for storage in the repository 1410, submit recommended changes to decision recipes and/or decision components for users, book decision recipes and/or decision components, and perform other suitable tasks.

The repository 1410 may store a plurality of decision recipes, including customizable decision recipes. A decision recipe in the repository 1410 may represent a decision plan for one or more users. The repository 1410 may include a plurality of predefined decision recipes and/or user-customized decision recipes. The predefined decision recipes may be supplied by providers 190A-190N including providers of underlying services in the decision recipes, agents, specialists, and/or other experts. Each decision recipe may include a set of decision components. The decision components may represent atomic elements of a potential solution towards one or more user-specified goals. In one embodiment, decision components may represent events, activities, and/or locations. In one embodiment, the decision components may be distributed over time (e.g., hours or days), each decision component may have a duration, and a decision recipe may include a chronological order for the set of decision components. The decision recipe repository 1410 or another suitable repository may also store decision components. At least some of the decision components may be supplied by providers 190A-190N. Examples of types of decisions that may be evaluated using decision recipes may include lifestyle decisions, employment decisions, residential relocation decisions, investment decisions, education decisions, health and exercise decisions, and other suitable types of decisions.

Using the decision recipe selection functionality 1420, a decision recipe 1411A may be selected from the repository 1410. In one embodiment, the decision recipe 1411A may be selected based (at least in part) on user input. However, it is contemplated that the decision recipe 1411A may be selected by the decision support system 1400 without direct input by the user for whom the decision recipe is selected, e.g., based on the history and/or preferences for the user and/or based on the history and/or preferences for other users or entities. In one embodiment, to select the decision recipe 1411A, a user (represented by one of the clients 180A-180N) may browse decision recipes in a set of named decision categories or search for types of decision components and/or specific decision components. At least a portion of the decision recipes in the repository 1410 may be tagged or otherwise classified in various decision categories for convenient browsing and/or searching. In one embodiment, multiple decision recipes may be selected for a single user with the recipe selection functionality 1420. In one embodiment, the repository 1410 may also store decision components independently of decision recipes, and multiple decision components may be selected for a single user with the recipe selection functionality 1420. In various embodiments, the decision components may be selected with or without user input.

Using the decision recipe customization functionality 1430, the decision recipe 1411A may be customized to create a customized decision recipe 1411B. The customized decision recipe 1411B may include one or more user-selected modifications to the chronological order. The customized decision recipe 1411B may include one or more user-selected substitutions to the set of decision components, one or more added components, and/or one or more deleted components. One or more user-selected substitutions to the set of decision components may be selected from a repository of decision components (potentially the same repository 1410 that stores decision recipes). The customized decision recipe 1411B may include a user-selected modification to the duration, starting time, and/or ending time of a decision component. The customized decision recipe 1411B may include one or more user-selected modifications to one or more parameters of a decision component. In one embodiment, the decision recipe 1411A may be customized based (at least in part) on user input, e.g., input from the user who selected the decision recipe and/or input from one or more additional users who are identified as potential participants in the decision recipe. In one embodiment, the decision recipe 1411A may be customized based (at least in part) on input from one or more social graph(s) 960, including a trust-based social graph in which connections between entities are determined based on a relationship score and a similarity score. The customized decision recipe 1411B may be stored in the repository 1410. In one embodiment, the customized decision recipe 1411B may represent a composite decision recipe that is generated based on multiple decision recipes, e.g., based on user input to combine different portions of the multiple decision recipes. In one embodiment, the customized decision recipe 1411B may be generated based on multiple decision components that are combined (e.g., based on user input) to generate a new decision recipe.

Using the decision recipe scoring functionality 1450, the aggregate score for a decision recipe may be estimated. The aggregate score may represent an estimated likelihood of success for the decision recipe as a whole or another indicator of the quality of the decision. The decision scoring functionality 1450 may determine the aggregate score based (at least in part) on individual scores for individual decision components in the decision recipe.

In one embodiment, at least a portion of a decision recipe such as the decision recipe 1411A or customized decision recipe 1411B may be booked with one or more providers 190A-190N. A particular range of time may be assigned to the decision recipe 1411A or 1411B. The particular range of time may include a specific starting date and time and a specific ending date and time. In one embodiment, the particular range of time may be assigned to the decision recipe 1411A or 1411B based (at least in part) on user input, e.g., input from the user who selected or customized the decision recipe and/or input from one or more additional users who are identified as potential participants in the decision recipe. The decision recipe 1411A or 1411B may be booked by generating a reservation of the decision recipe for one or more clients, e.g., for the particular range of time. The client(s) may include the user who selected or customized the decision recipe and/or one or more additional users who are identified as potential participants in the decision recipe. The reservation may include an agreement by the one or more clients to purchase at least a portion of the decision recipe 1411A or 1411B and/or any other suitable transaction, including a payment to one or more providers. The reservation may be booked through one or more providers 190A-190N, including travel agents, travel guides, event providers, lodging providers, transportation providers, and/or other providers of underlying services. The providers participating in the booking may be structured in a plurality of levels or tiers, such that one provider may act as an agent to package a set of decision components (e.g., representing events and/or services) to clients and then arrange for payment with one or more other providers who actually provide the events and/or services. The decision recipe 1411A or 1411B may be booked using one or more payment services of any suitable type.

The decision support system 1400 may comprise one or more computing devices, any of which may be implemented by the example computing device 5000 illustrated in FIG. 18. In various embodiments, portions of the functionality of the decision support system 1400 may be provided by the same computing device or by any suitable number of different computing devices. If any of the components of the decision support system 1400 (such as the decision recipe repository 1410, decision recipe selection functionality 1420, decision recipe customization functionality 1430, and decision scoring functionality 1450) are implemented using different computing devices, then the components and their respective computing devices may be communicatively coupled, e.g., via a network. Each of the illustrated components (such as the decision recipe repository 1410, decision recipe selection functionality 1420, decision recipe customization functionality 1430, and decision scoring functionality 1450) may represent any combination of software and hardware usable to perform their respective functions.

It is contemplated that the decision support system 1400 may include additional components not shown, fewer components than shown, or different combinations, configurations, or quantities of the components shown. For example, although three clients 180A, 180B, and 180N are shown for purposes of example and illustration, it is contemplated that different quantities and configurations of clients may be used. Additionally, although three providers 190A, 190B, and 190N are shown for purposes of example and illustration, it is contemplated that different quantities and configurations of providers may be used.

In some embodiments, decision support system 1400, clients 180A-180N, and/or providers 190A-190N may be implemented using virtual compute instances and/or physical compute instances. The virtual compute instances and/or physical compute instances may be offered to clients, provisioned, and maintained by a provider network that manages computational resources, memory resources, storage resources, and network resources. A virtual compute instance may comprise one or more servers with a specified computational capacity (which may be specified by indicating the type and number of CPUs, the main memory size, and so on) and a specified software stack (e.g., a particular version of an operating system, which may in turn run on top of a hypervisor). One or more virtual compute instances may be implemented by the example computing device 5000 illustrated in FIG. 18.

In one embodiment, the decision support system 1400 may select and/or provision virtual compute instances for implementing the various components of the travel planning system (such as the decision recipe repository 1410, decision recipe selection functionality 1420, decision recipe customization functionality 1430, and decision scoring functionality 1450). For example, the virtual compute instances may be provisioned from a suitable pool of available computing instances. In one embodiment, additional computing instances may be added to the decision support system 1400 as needed. In one embodiment, computing instances may be returned to the pool of available computing instances if the computing instances are not needed at a particular point in time.

In one embodiment, the functionality of the decision support system 1400 may be provided to clients 180A-180N and/or providers 190A-190N using a provider network. For example, the functionality of the decision support system 1400 may be presented to clients and/or providers as a web-accessible service. A network set up by an entity such as a company or a public sector organization to provide one or more services (such as various types of cloud-based computing or storage) accessible via the Internet and/or other networks to a distributed set of clients may be termed a provider network. A provider network may include numerous data centers hosting various resource pools, such as collections of physical and/or virtualized computer servers, storage devices, networking equipment and the like, that are used to implement and distribute the infrastructure and services offered by the provider. The resources may, in some embodiments, be offered to clients in units called "instances," such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices, and the like.

Figure 15:
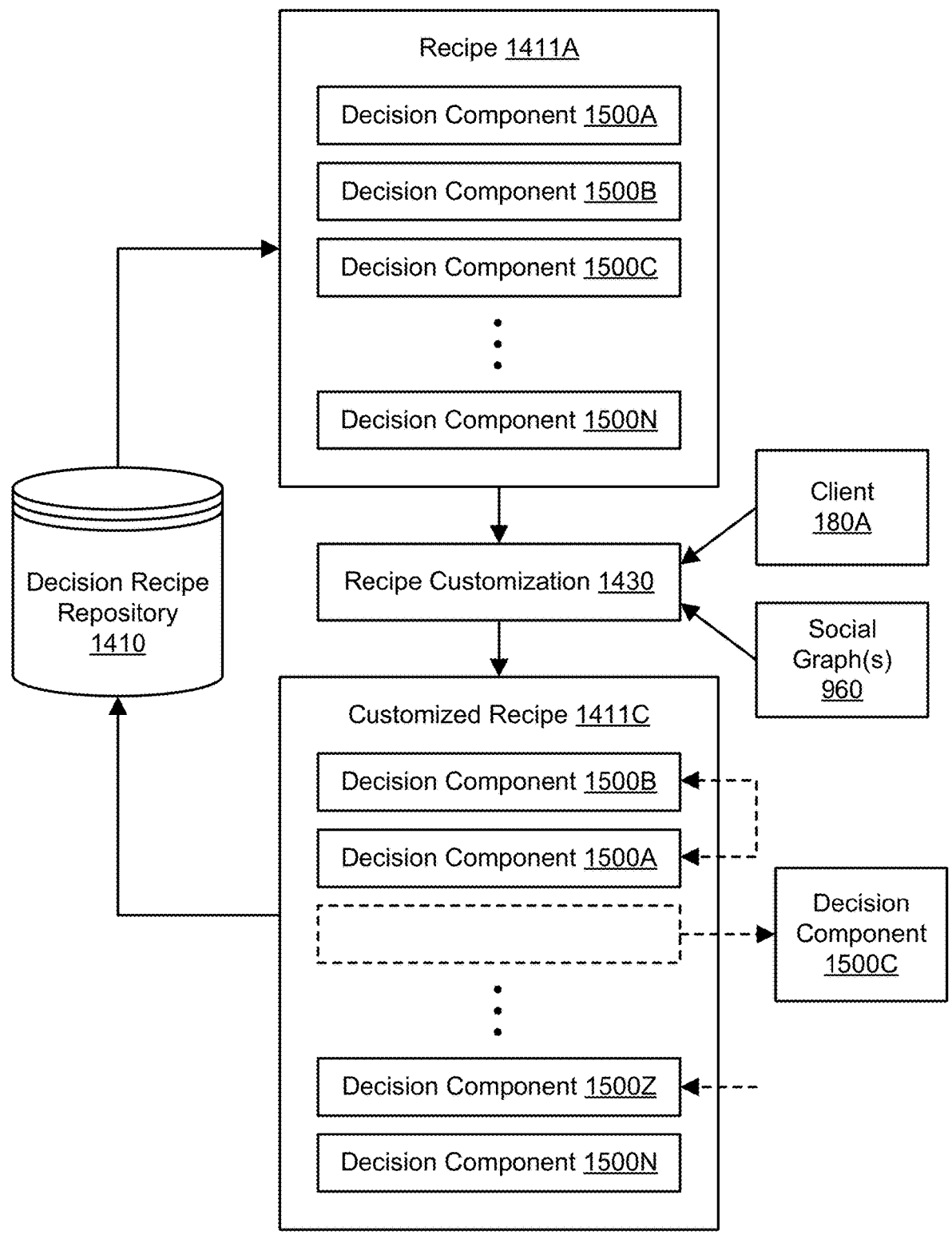
FIG. 15 illustrates examples of customization of decision recipes using input from a social graph, according to one embodiment.

FIG. 15 illustrates examples of customization of decision recipes using input from a social graph, according to one embodiment. The decision recipe 1411A may include a set of decision components (such as decision components 1500A-1500N) that represent atomic elements of a potential solution towards one or more user-specified goals. Although four decision components 1500A through 1500C and 1500N are shown for purposes of example and illustration, it is contemplated that any suitable number and configuration of decision components may be used with a decision recipe. The decision components 1500A-1500N may be distributed over time (e.g., hours or days), each decision component may have a duration, and the particular decision recipe may include a chronological order for the set of decision components. The decision recipe 1411A may represent a predefined decision recipe or a decision recipe that has been previously copied and/or customized one or more times.

As shown in FIG. 15, the decision recipe customization functionality 1430 may generate a customized decision recipe 1411C based on the decision recipe 1411A. The customized decision recipe 1411C may be generated based (at least in part) on user input, e.g., as entered by a client 180A from a user who selected the decision recipe 1411A and/or from one or more additional users who are identified as potential participants in the decision recipe. The customized decision recipe 1411C may be generated based (at least in part) on input from one or more social graph(s) 960, including a trust-based social graph in which connections between entities are determined based on a relationship score and a similarity score. The customized decision recipe 1411C may be stored in the repository 1410 for potential reuse, including duplication and/or further customization by the same user or one or more additional users. The customized decision recipe 1411C may include one or more modifications to the order of components. As shown in the example of FIG. 15, the order of decision components 1500A and 1500B has been swapped in the customized decision recipe 1411C.

The customized decision recipe 1411C may include one or more deleted decision components. As shown in the example of FIG. 15, component 1500C has been removed from the customized decision recipe 1411C. In one embodiment, the dates and times, durations, and/or other parameters of other components may be modified automatically in response to the deletion of component 1500C, e.g., to fit the entire decision recipe within a particular range of time indicated by a starting date and time and an ending date and time.

The customized decision recipe 1411C may include one or more added decision components. As shown in the example of FIG. 15, new decision component 1500Z has been added to the customized decision recipe 1411C in a particular slot prior to component 1500N. In one embodiment, the new decision component 1500Z may be selected from a repository of decision components (potentially the same repository 1410 that stores decision recipes). In one embodiment, the dates and times, durations, and/or other parameters of other components may be modified automatically in response to the addition of component 1500Z, e.g., to fit the entire decision recipe within a particular range of time indicated by a starting date and time and an ending date and time.

Figure 16:
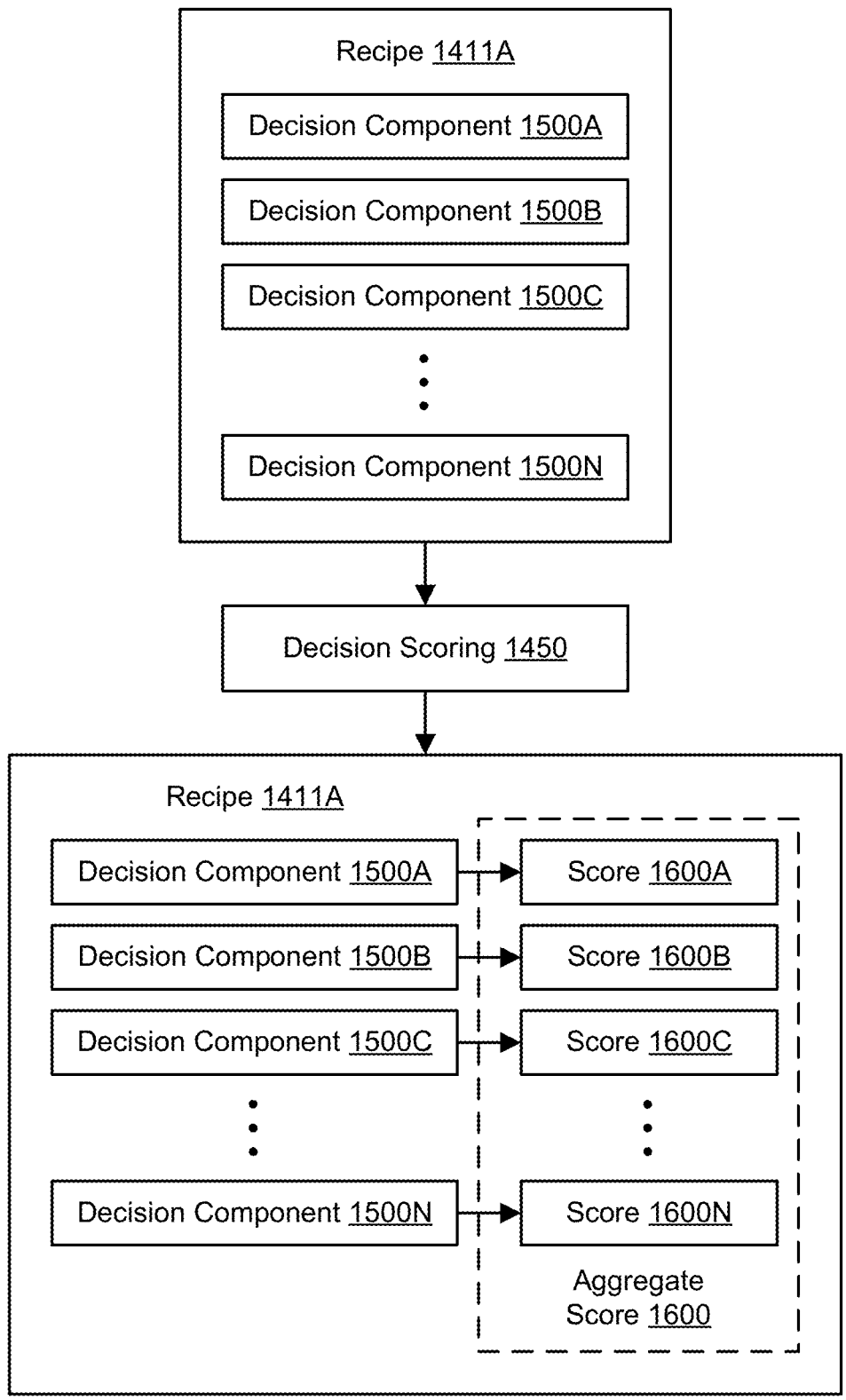
FIG. 16 illustrates risk scoring of customizable decision recipes, according to one embodiment.

FIG. 16 illustrates decision scoring of customizable decision recipes for travel planning, according to one embodiment. Using the decision scoring functionality 1450, the aggregate score 1600 for a decision recipe 1411A may be estimated. The aggregate score 1600 may represent an estimated likelihood of success for the decision recipe 1411A as a whole. The decision scoring functionality 1450 may determine the aggregate score 1600 based (at least in part) on individual scores for individual decision components in the decision recipe 1411A, such as score 1600A for decision component 1500A, score 1600B for decision component 1500B, score 1600C for decision component 1500C, and score 1600N for decision component 1500N. The individual scores 1600A-1600N may also be determined by the decision scoring functionality 1450. Each of the individual scores 1600A-1600N may represent an estimated likelihood of success for the corresponding decision component. The individual scores 1600A-1600N and the aggregate score 1600 may be determined for a particular range of time assigned to the decision recipe, including a starting date and time and an ending date and time. In one embodiment, the individual scores 1600A-1600N and/or aggregate score 1600 may be evaluated relative to one or more goals and/or constraints. The goals and/or constraints may be specified by one or more users or may be default elements of a particular decision recipe.

Each of the individual scores 1600A-1600N may be determined based on a definition of success for the corresponding decision component. The definitions of success may be associated with particular components or with categories of components. The definitions of success may be evaluated with respect to any suitable information concerning a decision recipe and/or its components, including historical success data for components, historical weather data for particular locales, anticipated weather data for particular locales, historical usage data for components, geographical or proximity analysis for decision components, and other suitable data for individual components or sets of components. For example, an event component may be evaluated based on an estimated likelihood that a reservation is honored or not honored by the underlying provider due to an estimated usage for particular dates. As another example, a transportation component may be evaluated based on an estimated likelihood that inclement weather does not cause cancellation for particular dates. The individual score for a decision component may be evaluated with respect to other decision components in the decision recipe. For example, an event component may be evaluated based on an estimated likelihood that the user can successfully begin the component at its assigned starting time in view of a geographical distance from the previous decision component and its assigned ending time. Similarly, one or more events components may be evaluated based on their proximity to a lodging component selected for the decision recipe.

The aggregate score 1600 may be displayed to one or more users, e.g., in a user interface. In one embodiment, the individual scores 1600A-1600N for decision components may also be displayed to one or more users. The scores may be displayed as numerals in a range representing a high chance of failure to a high chance of success (e.g., between 0 and 100). The scores may be displayed as graphical elements representing varying chances of failure or success. For example, a green indicator may be displayed for a decision recipe or component with a high chance of success, a yellow indicator may be displayed for a decision recipe or component with a medium chance of success, and a green indicator may be displayed for a decision recipe or component with a low chance of success. If the decision recipe is customized (or further customized), the risk may be estimated again, and the updated score may again be displayed to one or more users. The individual scores 1600A-1600N and the aggregate score 1600 may be updated based on the availability of new data or new definitions of success. In one embodiment, the travel planning system 100 may recommend substitute decision components or modified parameters for decision components in order to increase the estimated likelihood of success as represented in the aggregate score 1600.

Figure 17:
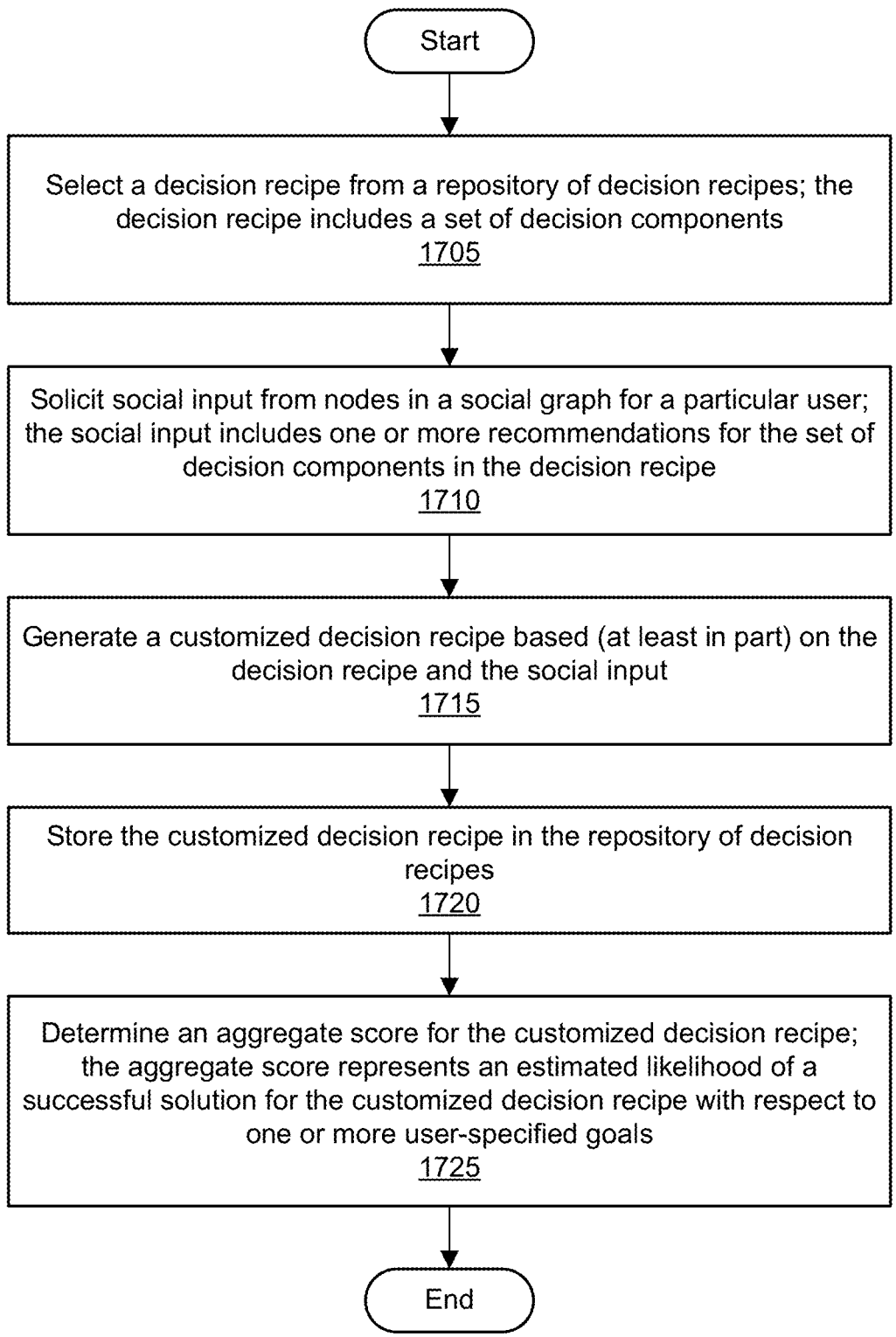
FIG. 17 is a flowchart illustrating a method for implementing a repository of customizable decision recipes, according to one embodiment.

FIG. 17 is a flowchart illustrating a method for implementing a repository of customizable decision recipes, according to one embodiment. As shown in 1705, a particular decision recipe may be selected from a repository of decision recipes. The repository of decision recipes may include a plurality of predefined decision recipes and/or user-customized decision recipes. For example, the predefined decision recipes may be supplied by providers, including providers of underlying services in the decision recipes, specialists, and/or other experts. The particular decision recipe may include a set of decision components. The decision components may represent atomic elements of a potential solution towards one or more user-specified goals. In one embodiment, decision components may be distributed over time (e.g., hours or days), each decision component may have a duration, and the particular decision recipe may include a chronological order for the set of decision components. The decision recipe repository or another suitable repository may also store decision components. At least some of the decision components may be supplied by providers. In one embodiment, the particular decision recipe may be selected based (at least in part) on user input. For example, the user may browse decision recipes in a set of named categories. At least a portion of the decision recipes in the repository may be tagged or otherwise classified in various categories for convenient browsing and/or searching. In one embodiment, a set of decision components may be selected from the repository; the selected decision component(s) may be selected independently of a decision recipe or may be part of a selected decision recipe.

As shown in 1710, social input may be solicited from a plurality of nodes in a social graph for the particular user. The social input may include one or more recommendations for the set of decision components in the particular decision recipe. The social input may be obtained programmatically and/or automatically through the social graph. The social input may represent recommendations for the customization of decision recipes, such as the selection of alternative decision components, the selection of a duration or particular date and time for one or more decision components, the selection of a duration or particular dates and times for the decision recipe, and/or any other suitable options or parameters. In one embodiment, the social input may be collected and through automated voting, e.g., using a social network interface to collect votes from other users. In one embodiment, votes may be weighted based on trust scores. In one embodiment, modifications based on social input may be recommended to the particular user account and then entered to a decision recipe based (at least in part on) user input representing an acceptance of the one or more modifications in the recommendation.

As shown in 1715, a customized decision recipe may be generated based (at least in part) on the particular decision recipe and on the social input. The customized decision recipe may include one or more modifications to the chronological order. The customized itinerary may include one or more substitutions to the set of decision components, one or more added components, and/or one or more deleted components. One or more substitutions to the set of decision components may be selected from a repository of decision components (potentially the same repository that stores decision recipes). The customized decision recipe may include a modification to the duration, starting time, and/or ending time of a decision component. The customized itinerary may include one or more modifications to one or more parameters of a decision component. In one embodiment, the particular decision recipe may be customized based (at least in part) on user input, e.g., input from the user who selected the decision recipe and/or input from one or more additional users who are identified as potential participants in the decision recipe. In one embodiment, the customized decision recipe may be generated based on a set of decision components (independent of any decision recipe) selected from the repository. As shown in 1720, the customized decision recipe may be stored in the repository of decision recipes.

As shown in 1725, an aggregate score may be determined for the customized decision recipe. The aggregate score may represent an estimated likelihood of a successful solution for the customized decision recipe with respect to one or more user-specified goals. The aggregate score may be determined based (at least in part) on respective scores for individual ones of the set of decision components, each of which may be associated with a definition of success for the individual component.

In one embodiment, one or more components of the customized decision recipe may be booked by generating a reservation for one or more clients. The client(s) may include the user who selected or customized the decision recipe and/or one or more additional users who are identified as potential participants in the decision recipe. The reservation may include an agreement by the one or more clients to purchase at least a portion of the customized decision recipe. The reservation may be booked through one or more providers, including specialists, experts, travel agents, travel guides, event providers, lodging providers, transportation providers, and/or other providers of underlying services. The providers participating in the booking may be structured in a plurality of levels or tiers, such that one provider may package a set of decision components (e.g., representing events and/or services) to clients and then arrange for payment with one or more other providers who actually provide the events and/or services. The customized decision recipe may be booked using one or more payment services of any suitable type.

In one embodiment, the customized decision recipe may be duplicated and further customized by the same user or one or more additional users. To duplicate the customized decision recipe, it may be selected from the repository of decision recipe, and a copy of the customized decision recipe may be generated. A customized copy may then be generated based on user input. For example, the customized copy may include one or more modifications to the chronological order; one or more substitutions to the set of decision components; one or more added components; one or more deleted components; a modification to the duration, starting time, and/or ending time of a decision component; and/or one or more modifications to one or more parameters of a decision component. The customized copy may be stored in the repository of decision recipes and may also be duplicated and further customized. A range of time (including a specific starting date and time and a specific ending date and time) may be assigned to the customized copy, and the customized copy of the customized decision recipe (representing a further customized decision recipe) may be booked by generating a reservation for one or more clients.

An original decision recipe may be customized, managed, or otherwise designated as owned by a first user, and a copy of that original decision recipe may be customized, managed, or otherwise designated as owned by a second user. If the second user customizes her or his copy, a notification of the changes may be sent automatically to the first user. In one embodiment, the changes may be presented to the first user, and the first user may enter user input to accept or reject the changes with respect to the original decision recipe. Similarly, if the original decision recipe is customized (or further customized) after the copy is made, a notification of the changes may be sent automatically to the second user. In one embodiment, the changes may be presented to the second user, and the second user may enter user input to accept or reject the changes with respect to the copy of the decision recipe. In one embodiment, a user may select or enable a privacy profile that may allow or deny the copying of private decision components and/or private decision recipes by particular other users and/or groups of users. Accordingly, based (at least in part) on a privacy profile and/or any suitable privacy mechanisms, decision components designated as private may be excluded from a copy of a decision recipe made by another user.

Illustrative Computer System

In at least some embodiments, a computer system that implements a portion or all of one or more of the technologies described herein may include a general-purpose computer system that includes or is configured to access one or more computer-readable media. FIG. 18 illustrates such a general-purpose computing device 5000. In the illustrated embodiment, computing device 5000 includes one or more processors 5010 (e.g., processors 5010A and 5010B through 5010N) coupled to a system memory 5020 via an input/output (I/O) interface 5030. Computing device 5000 further includes a network interface 5040 coupled to I/O interface 5030.

In various embodiments, computing device 5000 may be a uniprocessor system including one processor 5010 or a multiprocessor system including several processors 5010 (e.g., two, four, eight, or another suitable number). Processors 5010 may include any suitable processors capable of executing instructions. For example, in various embodiments, processors 5010 may be general-purpose or embedded processors implementing any of a variety of instruction set architectures (ISAs), such as the x86, PowerPC, SPARC, or MIPS ISAs, or any other suitable ISA. In multiprocessor systems, each of processors 5010 may commonly, but not necessarily, implement the same ISA.

System memory 5020 may be configured to store program instructions and data accessible by processor(s) 5010. In various embodiments, system memory 5020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 5020 as code (i.e., program instructions) 5025 and data 5026.

In one embodiment, I/O interface 5030 may be configured to coordinate I/O traffic between processor 5010, system memory 5020, and any peripheral devices in the device, including network interface 5040 or other peripheral interfaces. In some embodiments, I/O interface 5030 may perform any necessary protocol, timing or other data transformations to convert data signals from one component (e.g., system memory 5020) into a format suitable for use by another component (e.g., processor 5010). In some embodiments, I/O interface 5030 may include support for devices attached through various types of peripheral buses, such as a variant of the Peripheral Component Interconnect (PCI) bus standard or the Universal Serial Bus (USB) standard, for example. In some embodiments, the function of I/O interface 5030 may be split into two or more separate components, such as a north bridge and a south bridge, for example. Also, in some embodiments some or all of the functionality of I/O interface 5030, such as an interface to system memory 5020, may be incorporated directly into processor 5010.

Network interface 5040 may be configured to allow data to be exchanged between computing device 5000 and other devices 5060 attached to a network or networks 5050, such as other computer systems or devices as illustrated in FIG. 1, for example. In various embodiments, network interface 5040 may support communication via any suitable wired or wireless general data networks, such as types of Ethernet network, for example. Additionally, network interface 5040 may support communication via telecommunications/telephony networks such as analog voice networks or digital fiber communications networks, via storage area networks such as Fibre Channel SANs, or via any other suitable type of network and/or protocol.

In some embodiments, system memory 5020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 5000 via I/O interface 5030. A non-transitory computer-readable storage medium may also include any volatile or non-volatile media such as RAM (e.g. SDRAM, DDR SDRAM, RDRAM, SRAM, etc.), ROM, etc, that may be included in some embodiments of computing device 5000 as system memory 5020 or another type of memory. Further, a computer-readable medium may include transmission media or signals such as electrical, electromagnetic, or digital signals, conveyed via a communication medium such as a network and/or a wireless link, such as may be implemented via network interface 5040. Portions or all of multiple computing devices such as that illustrated in FIG. 18 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. In various of the methods, the order of the steps may be changed, and various elements may be added, reordered, combined, omitted, modified, etc. Various of the steps may be performed automatically (e.g., without being directly prompted by user input) and/or programmatically (e.g., according to program instructions).

Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
one or more computing devices configured to implement a travel planning system, wherein the travel planning system is configured to:
obtain social data for a user account and a plurality of additional accounts, wherein the social data comprises travel preferences and purchase histories from one or more social networks via a programmatic interface between the travel planning system and the one or more social networks, the travel preferences and purchase histories obtained to determine respective trust scores for the user account with respect to individual ones of the plurality of additional accounts;
determine, for the user account, respective relationship scores for individual ones of the plurality of additional accounts based at least in part on the social data, wherein, for an individual one of the additional accounts, the respective relationship score represents a strength of a relationship with the user account, and wherein the additional accounts represent users or entities;
determine, for the user account, respective similarity scores for individual ones of the plurality of additional accounts based at least in part on analysis of the social data comprising the travel preferences and the purchase histories associated with user account and the additional accounts, wherein, for an individual one of the additional accounts, the respective similarity score represents a similarity of interests or preferences with respect to the user account, and wherein the respective similarity score is distinct from the respective relationship score;
determine, for the user account, respective trust scores for individual ones of the plurality of additional accounts, wherein, for an individual one of the additional accounts, the respective trust score is determined based at least in part on the respective relationship score and the respective similarity score for the individual one of the additional accounts;

generate one or more respective connections in a social graph between the user account and one or more trusted accounts of the additional accounts, wherein the one or more respective connections with the trusted accounts are generated based at least in part on the respective trust scores, and wherein the social graph is maintained by the one or more computing devices;

modify an itinerary for the user account to generate a modified itinerary, wherein the itinerary is modified based at least in part on the respective connections with the one or more trusted accounts; and store the modified itinerary.

2. The system as recited in claim 1, wherein an additional account has no preexisting relationship with the user account, and wherein the travel planning system is configured to:

recommend, to the user account, a connection to the additional account in the social graph, wherein the connection is recommended based at least in part on a similarity score for the additional account.

3. The system as recited in claim 1, wherein the respective similarity score for the one of the additional accounts is determined based at least in part on analysis of one or more photos associated with the one of the additional accounts.

4. The system as recited in claim 1, wherein the social data comprises relationship data obtained from one or more external social graphs.

5. The system as recited in claim 1, wherein the itinerary comprises a set of trip components representing a plurality of events or a plurality of locations, wherein the itinerary comprises a chronological order for the set of trip components, and wherein the travel planning system is configured to:

generate a recommendation, to the user account, of one or more modifications to the set of trip components or to the chronological order, wherein the one or more modifications are determined based on analysis of travel data from the one or more trusted accounts, and wherein the itinerary is modified based at least in part on user input representing an acceptance of the one or more modifications in the recommendation.

6. A computer-implemented method, comprising:

performing, by a system comprising a user account, the system implemented on one or more computing devices:

obtaining social data for a user account and a plurality of additional accounts, wherein the social data comprises travel preferences and purchase histories for one or more additional accounts from one or more social network services via a programmatic interface, the travel preferences and purchase histories obtained to determine respective trust scores for the user account with respect to individual ones of the plurality of additional accounts;

determining, for the user account, respective trust scores for individual ones of the plurality of the additional accounts based at least in part on analyzing the social data comprising the travel preferences and the purchase histories for the one or more additional accounts, wherein, for one of the additional accounts, the respective trust score is determined based at least in part on a respective relationship score and a respective similarity score for the one of the additional accounts, wherein the respective similarity score is distinct from the respective relationship score, wherein the respective relationship score represents a strength of a relationship with the user account, and wherein the respective similarity score represents a similarity of interests with respect to the user account that is based at least in part on analyzing the social data comprising the travel preferences and purchase history for the one of the additional accounts;

generating one or more respective connections in a social graph between the user account and one or more trusted accounts of the additional accounts, wherein the one or more respective connections with the trusted accounts are generated based at least in part on the respective trust scores;

modifying an itinerary for the user account to generate a modified itinerary, wherein the itinerary is modified based at least in part on the respective connections with the one or more trusted accounts; and storing the modified itinerary.

7. The method as recited in claim 6, wherein, for one of the additional accounts, the respective relationship score represents a strength of a relationship with the account, and wherein, for one of the additional accounts, the respective similarity score represents a similarity of preferences with respect to the account.

8. The method as recited in claim 6, wherein an additional account has no preexisting relationship with the account, and wherein the method further comprises performing, by the system implemented on the one or more computing devices:

recommending, to a user or entity for the account, a connection to the additional account in the social graph, wherein the connection is recommended based at least in part on a similarity score for the additional account.

9. The method as recited in claim 6, wherein the method further comprises performing, by the system implemented on the one or more computing devices:

performing an analysis of one or more photos associated with one of the additional accounts, wherein a respective similarity score for the one of the additional accounts is determined based at least in part on the analysis of the one or more photos.

10. The method as recited in claim 6, wherein the method further comprises performing, by the system implemented on the one or more computing devices:

performing an analysis of travel preferences associated with one of the additional accounts, wherein a respective similarity score for the one of the additional accounts is determined based at least in part on the analysis of the travel preferences.

11. The method as recited in claim 6, wherein the method further comprises performing, by the system implemented on the one or more computing devices:

performing an analysis of a purchase history associated with one of the additional accounts, wherein a respective similarity score for the one of the additional accounts is determined based at least in part on the analysis of the purchase history.

12. The method as recited in claim 6, wherein the social data comprises relationship data obtained from one or more external social graphs.

13. The method as recited in claim 6, wherein an itinerary comprises a set of trip components representing a plurality of events or a plurality of locations, wherein the itinerary comprises a chronological order for the set of trip components, and wherein the method further comprises performing, by the system implemented on the one or more computing devices:

generating a recommendation, to a user or entity for the account, of one or more modifications to the set of trip components or to the chronological order, wherein the one or more modifications are determined based on analysis of travel data from the one or more trusted accounts, and wherein the itinerary is modified based at least in part on user input representing an acceptance of the one or more modifications in the recommendation.

14. The method as recited in claim 6, wherein the social data is obtained using a subscription interface to a travel planning service.

15. A non-transitory computer-readable storage medium storing program instructions computer-executable to perform:

for a system comprising a user account:

obtaining, social data for a user account and a plurality of additional accounts, wherein the social data comprises travel preferences and purchase histories for one or more additional accounts from one or more social network services via a programmatic interface, the travel preferences and purchase histories obtained to determine respective trust scores for the user account with respect to individual ones of the plurality of additional accounts;

determining, for the user account, respective trust scores for individual ones of the plurality of the additional accounts based at least in part on analyzing the social data comprising the travel preferences and the purchase histories for the one or more additional accounts, wherein, for one of the additional accounts, the respective trust score is determined based at least in part on a respective relationship score and a respective similarity score for the one of the additional accounts, wherein the respective similarity score is distinct from the respective relationship score, wherein the respective relationship score represents a strength of a relationship with the user account, and wherein the respective similarity score represents a similarity of interests with respect to the user account that is based at least in part on analyzing the social data comprising the travel preferences and purchase history for the one of the additional accounts;

generating one or more respective connections in a social graph between the user account and one or more trusted accounts of the additional accounts, wherein the one or more respective connections with the trusted accounts are generated based at least in part on the respective trust scores;

modifying an itinerary for the user account to generate a modified itinerary, wherein the itinerary is modified based at least in part on the respective connections with the one or more trusted accounts; and storing the modified itinerary.

16. The non-transitory computer-readable storage medium as recited in claim 15, wherein an additional account has no preexisting relationship with the user account, and wherein the program instructions are further computer-executable to perform:

recommending, to the user account, a connection to the additional account in the social graph, wherein the connection is recommended based at least in part on a similarity score for the additional account.

17. The non-transitory computer-readable storage medium as recited in claim 15, wherein the program instructions are further computer-executable to perform:

performing an analysis of one or more photos or textual elements associated with one of the additional accounts, wherein a respective similarity score for the one of the additional accounts is determined based at least in part on the analysis of the one or more photos or textual elements.

18. The non-transitory computer-readable storage medium as recited in claim 15, wherein the program instructions are further computer-executable to perform:

performing the analyzing the purchase history associated with the one of the additional accounts.

19. The non-transitory computer-readable storage medium as recited in claim 15, wherein to perform said modifying the program instructions are further computer-executable to perform:

modifying, based at least in part on the respective connections with the one or more trusted accounts, an itinerary for the user account to generate a modified itinerary, wherein the itinerary comprises a set of trip components representing a plurality of events or a plurality of locations, wherein the itinerary comprises a chronological order for the set of trip components; and wherein the program instructions further computer-executable to perform generating a recommendation, to the user account, of one or more modifications to the set of trip components or to the chronological order, wherein the one or more modifications are determined based on analysis of travel data from the one or more trusted accounts, and wherein the itinerary is modified based at least in part on user input representing an acceptance of the one or more modifications in the recommendation.

20. The non-transitory computer-readable storage medium as recited in claim 15, wherein the social data is obtained using a subscription interface to a travel planning system.

* * * * *